US012456809B2

(12) United States Patent
Sugahara et al.

(10) Patent No.: US 12,456,809 B2
(45) Date of Patent: Oct. 28, 2025

(54) ANTENNA MODULE

(71) Applicant: Murata Manufacturing Co., Ltd., Nagaokakyo (JP)

(72) Inventors: Tadashi Sugahara, Nagaokakyo (JP); Yoshiki Yamada, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 177 days.

(21) Appl. No.: 18/488,061

(22) Filed: Oct. 17, 2023

(65) Prior Publication Data

US 2024/0047881 A1 Feb. 8, 2024

Related U.S. Application Data

(63) Continuation of application No. PCT/JP2022/012224, filed on Mar. 17, 2022.

(30) Foreign Application Priority Data

Apr. 21, 2021 (JP) ................................ 2021-071980

(51) Int. Cl.
*H01Q 9/04* (2006.01)
*H01Q 21/24* (2006.01)

(52) U.S. Cl.
CPC ........... *H01Q 9/0407* (2013.01); *H01Q 21/24* (2013.01)

(58) Field of Classification Search
CPC ...... H01Q 9/0407; H01Q 21/24; H01Q 1/523; H01Q 1/2283; H01Q 1/38; H01Q 5/42; H01Q 21/08
See application file for complete search history.

(56) References Cited

U.S. PATENT DOCUMENTS

2020/0381843 A1* 12/2020 Murata .................. H01Q 1/243

FOREIGN PATENT DOCUMENTS

JP 2005-535255 A 11/2005
JP 2014-212361 A 11/2014
(Continued)

OTHER PUBLICATIONS

International Search Report and Written Opinion mailed on Jun. 21, 2022, received for PCT Application PCT/JP2022/012224, filed on Mar. 17, 2022, 9 pages including English Translation.

*Primary Examiner* — Seung H Lee
(74) *Attorney, Agent, or Firm* — XSENSUS LLP

(57) ABSTRACT

An antenna module includes first and second dielectric substrates having different normal directions, and first and second radiating elements. The first radiating elements are disposed in the X-axis direction at the first dielectric substrate. The second radiating elements are disposed in the X-axis direction at the second dielectric substrate. The first radiating elements disposed in the X-axis direction are more than the second radiating elements disposed in the X-axis direction. The measurement perpendicular to the X-axis direction of the second dielectric substrate is shorter than the measurement perpendicular to the X-axis direction of the first dielectric substrate. The distance from a second radiating element closest to an end portion in the X-axis direction of the second dielectric substrate to the end portion is longer than the distance from a first radiating element closest to an end portion in the X-axis direction of the first dielectric substrate to the end portion.

19 Claims, 14 Drawing Sheets

(56) References Cited

FOREIGN PATENT DOCUMENTS

| | | | |
|---|---|---|---|
| JP | 2014-529971 | A | 11/2014 |
| JP | 2018-530945 | A | 10/2018 |
| WO | 2018/230475 | A1 | 12/2018 |
| WO | 2019/163419 | A1 | 8/2019 |
| WO | 2020/261807 | A1 | 12/2020 |
| WO | 2021/039102 | A1 | 3/2021 |

* cited by examiner

ANTENNA MODULE

CROSS-REFERENCE TO RELATED APPLICATIONS

This application is a continuation of international application no. PCT/JP2022/012224, filed Mar. 17, 2022, and which claims priority to Japanese application no. 2021-071980, filed Apr. 21, 2021. The entire contents of both prior applications are hereby incorporated by reference.

TECHNICAL FIELD

The present disclosure relates to antenna modules and to improving antenna characteristics of an antenna module capable of directing radio waves in two directions.

BACKGROUND ART

A microstrip antenna includes radiating elements disposed on individual surfaces of a planar dielectric substrate that is folded. This antenna module is able to direct radio waves in two or more different directions.

CITATION LIST

Patent Document

Patent Document 1: Japanese Unexamined Patent Application Publication No. 2014-212361

SUMMARY

Technical Problem

The antenna module as described above can be in some cases used in mobile communication devices exemplified by mobile phones and smartphones. In these cases, for example, a first radiating surface is provided at a major surface having a display, which is relatively large in area, and a second radiating surface is provided at a side surface, which is relatively small in area. The demand for reduction of size and thickness of such communication devices remains high. To satisfy this demand, the measurements of the side surface having the second radiating surface (specifically, the thickness of the communication devices) can be limited.

Concerning microstrip antennas using planar radiating elements, as the area of the dielectric substrate (in other words, the area of a ground electrode) diminishes with respect to the radiating elements, the antenna characteristics usually tend to degrade. Hence, when the area of the dielectric substrate is limited due to the size reduction of communication devices as described above, there is a possibility that desired antenna characteristics be not achieved.

The present disclosure has been made to address such a problem, by, for example, reducing degradation of antenna characteristics of an antenna module capable of directing radio waves in two different directions, due to limitation of the area of a dielectric substrate.

Solution to Problem

An antenna module according to the present disclosure includes a first substrate and a second substrate that have different normal directions, and a number $m_1$ of first radiating elements and a number $n_1$ of second radiating elements. The first radiating elements are disposed in a first direction at the first substrate. The second radiating elements are disposed in the first direction at the second substrate. The first radiating elements disposed in the first direction are more than the second radiating elements disposed in the first direction ($m_1>n_1$). The measurement perpendicular to the first direction of the second substrate is shorter than the measurement perpendicular to the first direction of the first substrate. The distance from a second radiating element closest to a first end portion in the first direction of the second substrate to the first end portion is longer than the distance from a first radiating element closest to a second end portion in the first direction of the first substrate to the second end portion.

EXEMPLARY ADVANTAGEOUS EFFECTS

In the antenna module according to the present disclosure, the second substrate, which is limited with respect to the measurements of a dielectric substrate of the second substrate, has radiating elements fewer than the first substrate. The distance between the radiating elements and an end portion of the dielectric substrate in the disposition direction (the first direction) in the second substrate is longer than the distance in the first substrate. This configuration reduces degradation of antenna characteristics of an antenna module capable of directing radio waves in two different directions, due to limitation of the area of a dielectric substrate.

DESCRIPTION OF EMBODIMENTS

Figure 1:
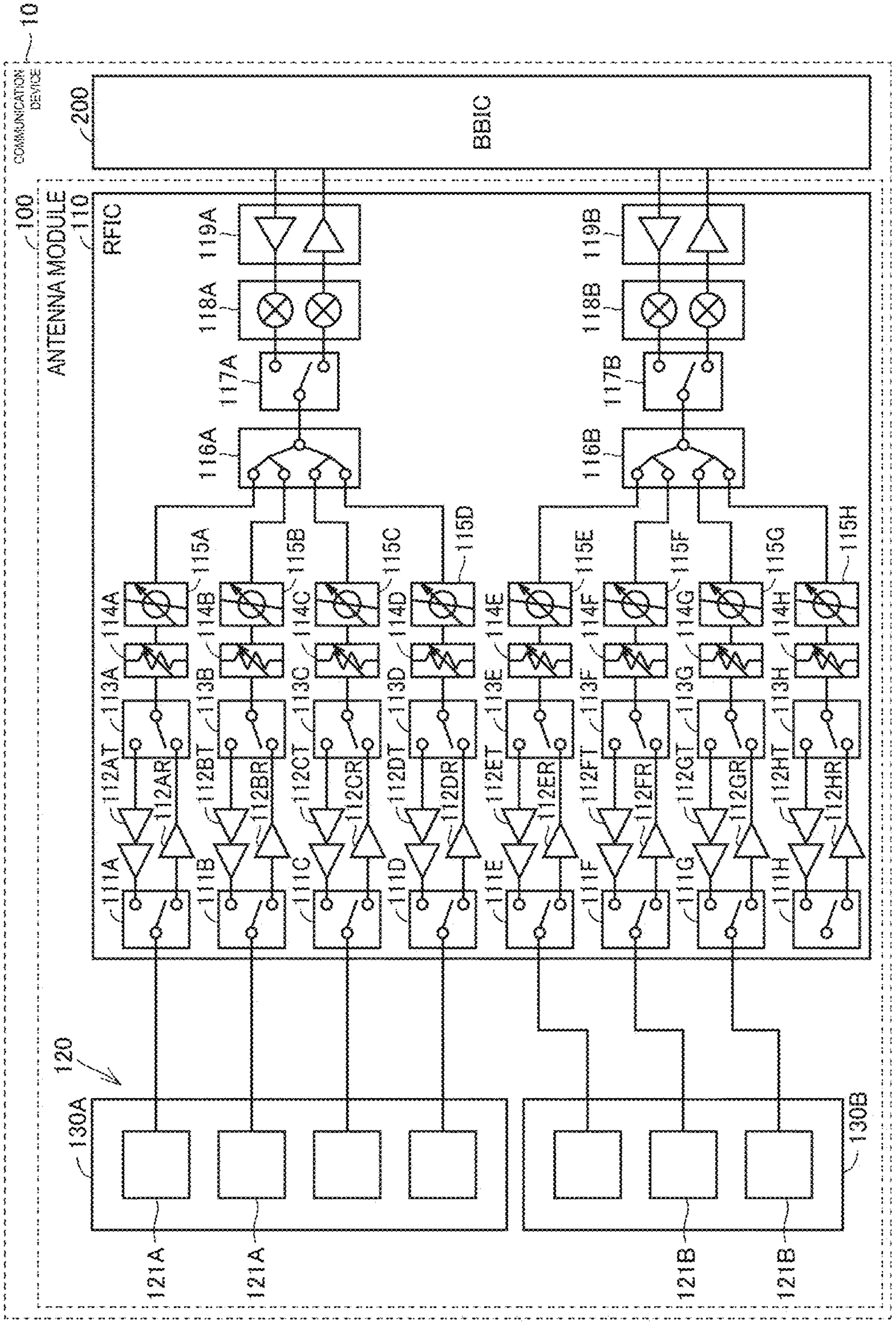
FIG. 1 is a block diagram of a communication device in which an antenna module according to a first exemplary embodiment is used.

Hereinafter, exemplary embodiments of the present disclosure will be described in detail with respect to the drawings. Identical or corresponding elements in the drawings are assigned identical reference numerals, and descriptions thereof are not repeated.

First Embodiment (Basic Configuration of Communication Device)

FIG. 1 is a block diagram of a communication device 10 in which an antenna module 100 according to a first exemplary embodiment is used. Examples of the communication device 10 includes mobile terminals, such as a mobile phone, a smartphone, and a tablet computer, and a personal computer having communication functionality. An exemplary frequency band of radio wave used by the antenna module 100 according to the present exemplary embodiment is a millimeter-wave band having a center frequency of, for example, 28 GHz, 39 GHz, or 60 GHz, but other frequency bands of radio wave may be used.

Referring to FIG. 1, the communication device 10 includes the antenna module 100 and a baseband integrated circuit (BBIC) 200 that implements a baseband signal processing circuit. The antenna module 100 includes a radio-frequency integrated circuit (RFIC) 110, which is an example of a feed circuit, and an antenna unit 120. The communication device 10 is operable to up-convert a signal transferred from the BBIC 200 to the antenna module 100 into a radio-frequency signal and emit the radio-frequency signal from the antenna unit 120; the communication device 10 is also operable to down-convert a radio-frequency signal received with the antenna unit 120 and process the down-converted signal with the BBIC 200.

The antenna unit 120 includes two dielectric substrates 130A and 130B. Multiple radiating elements are disposed at each dielectric substrate. More specifically, a number $m_1$ of radiating elements 121A (a first radiating element) are disposed at the dielectric substrate 130A, and a number $n_1$ of radiating elements 121B (a second radiating element) are disposed at the dielectric substrate 130B. As will be described later, the number $m_1$ of the radiating elements 121A disposed at the dielectric substrate 130A are more than the number $n_1$ of the radiating elements 121B disposed at the dielectric substrate 130B ($m_1>n_1$).

FIG. 1 illustrates an example configuration in which four radiating elements 121A are disposed at the dielectric substrate 130A, and three radiating elements 121B are disposed at the dielectric substrate 130B ($m_1=4$, $n_1=3$). The numbers of radiating elements disposed at individual dielectric substrates are, however, not limited to this example when $m_1>n_1$. In the example in FIG. 1, at each dielectric substrate, the radiating elements are disposed in a one-dimensional array, in which the radiating elements are arranged in one column. The radiating elements may, however, be disposed in two-dimensional arrays at each dielectric substrate. In the present exemplary embodiment, the radiating elements 121A and 121B are almost square, planar microstrip antennas.

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, signal combiner/splitter elements 116A and 116B, mixers 118A and 118B, and amplifier circuits 119A and 119B. Among these configuration elements, the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal combiner/splitter element 116A, the mixer 118A, and the amplifier circuit 119A form a circuit for radio-frequency signals to be emitted from the radiating elements 121A of the dielectric substrate 130A. The switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal combiner/splitter element 116B, the mixer 118B, and the amplifier circuit 119B form a circuit for radio-frequency signals to be emitted from the radiating elements 121B of the dielectric substrate 130B. As described above, in the antenna module 100 of the first exemplary embodiment, only the three radiating elements 121B are disposed at the dielectric substrate 130B, and thus, the signal path having the switch 111H does not lead to any radiating element.

When a radio-frequency signal is being transmitted, the switches 111A to 111H and 113A to 113H are controlled to establish connection to the power amplifiers 112AT to 112HT, and the switches 117A and 117B are controlled to establish connection to transmit-side amplifiers of the amplifier circuits 119A and 119B. When a radio-frequency signal is being received, the switches 111A to 111H and 113A to 113H are controlled to establish connection to the low-noise amplifiers 112AR to 112HR, and the switches 117A and 117B are controlled to establish connection to receive-side amplifiers of the amplifier circuits 119A and 119B.

Signals transferred from the BBIC 200 are amplified by the amplifier circuits 119A and 119B and up-converted by the mixers 118A and 118B into radio-frequency signals serving as transmit signals. Each up-converted radio-frequency transmit signal is split into four signals by the signal combiner/splitter elements 116A and 116B. The split signals are transferred along corresponding signal paths and fed to the corresponding radiating elements 121A or 121B. The directivity of radio waves outputted from each radiating element of the dielectric substrates is controllable by changing the degree of phase shift of a corresponding phase shifter among the phase shifters 115A to 115H provided in the signal paths.

Radio-frequency signals as receive signals are received by the radiating elements 121A or 121B, and the receive signals are transferred to the RFIC 110, further transferred along four different signal paths, and combined by the corresponding signal combiner/splitter element 116A or 116B. The combined receive signal is down-converted by the mixer 118A or 118B, amplified by the amplifier circuit 119A or 119B, and transferred to the BBIC 200.

The RFIC 110 is formed as, for example, a one-chip integrated circuit component having the circuit configuration described above. Alternatively, the elements (switches, a power amplifier, a low-noise amplifier, an attenuator, and a phase shifter) corresponding to each of the radiating elements 121A and 121B of the RFIC 110 may be integrated into one-chip integrated circuit component.

(Antenna Module Configuration)

Figure 2:
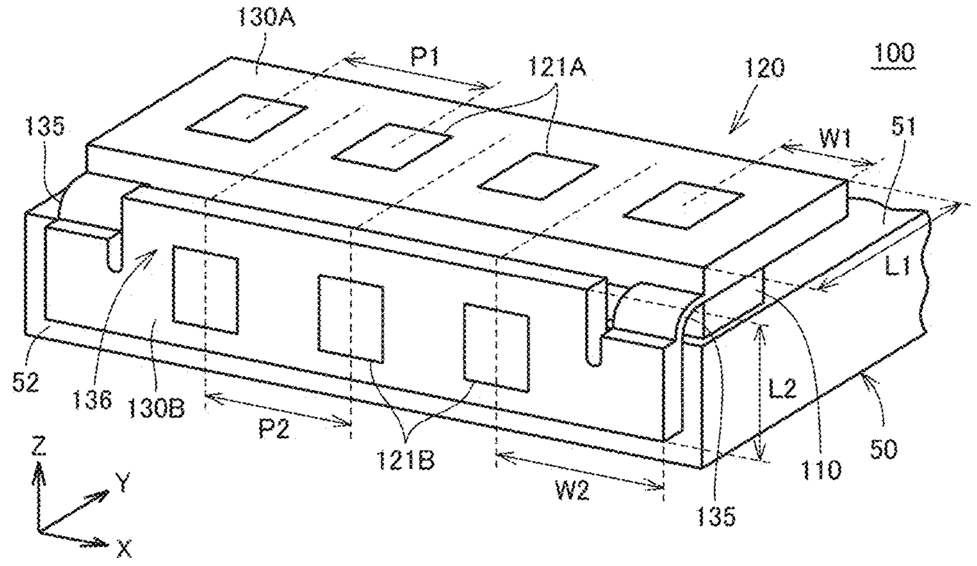
FIG. 2 is a perspective view of the antenna module according to the first exemplary embodiment.

The following describes in detail a configuration of the antenna module 100 in the first exemplary embodiment with reference to FIG. 2. FIG. 2 is a perspective view of the antenna module 100.

The antenna module 100 includes, as described above, the dielectric substrates 130A and 130B. The dielectric substrates 130A and 130B are disposed on an almost cuboid mounting board 50. In the following description, the normal direction to a major surface 51 of the mounting board 50 corresponds to the Z axis, and the directions along two sides of the major surface 51 correspond to the X-axis direction and the Y-axis direction.

Each of the dielectric substrates 130A and 130B has a planar shape substantially extending in the X-axis direction. The dielectric substrate 130A and the dielectric substrate 130B are positioned such that the normal direction of the dielectric substrate 130A points in a direction different from the normal direction of the dielectric substrate 130B. Specifically, the dielectric substrate 130A is positioned such that the normal direction of the dielectric substrate 130A points in the Z-axis direction, and the dielectric substrate 130B is positioned such that the normal direction of the dielectric substrate 130B points in the Y-axis direction. In other words, the dielectric substrate 130A faces the major surface 51 of the mounting board 50, and the dielectric substrate 130B faces a side surface 52 along the X axis of the mounting board 50. The RFIC 110 is disposed between the dielectric substrate 130A and the mounting board 50.

The dielectric substrate 130A is connected with the dielectric substrate 130B by joint members 135. In the antenna module 100, the dielectric substrates 130A and 130B are almost the same as regards the measurement in the X-axis direction; the joint members 135 are formed at least both end portions of the dielectric substrates. The joint members 135 may also be provided at a middle portion in the X-axis direction of the dielectric substrates. The connection of the dielectric substrates at the end portions reduces the likelihood of misalignment of the dielectric substrates. When viewed in plan view in the X-axis direction, the antenna unit 120 has a substantially L-shape formed by the dielectric substrates 130A and 130B and the joint members 135.

The dielectric substrate 130A has a substantially rectangular shape when viewed in plan view in the normal direction to the dielectric substrate 130A (the Z-axis direction). The four radiating elements 121A are disposed at pitches P1 in the X-axis direction at the dielectric substrate 130A. In the example in FIG. 2, the radiating elements 121A are exposed at a surface of the dielectric substrate 130A, but the radiating elements 121A may be disposed in an inner layer of the dielectric substrate 130A.

The dielectric substrate 130B has a substantially rectangular shape with cutouts at the locations corresponding to the joint members 135 when viewed in plan view in the normal direction to the dielectric substrate 130B (the Y-axis direction). A portion without the cutouts of the dielectric substrate 130B forms a raised portion 136 extending in the Z-axis direction. The three radiating elements 121B are disposed at pitches P2 in the X-axis direction in the region of the raised portion 136 of the dielectric substrate 130B. In the example in FIG. 2, the radiating elements 121B are also exposed at a surface of the dielectric substrate 130B, but the radiating elements 121B may be disposed in an inner layer of the dielectric substrate 130B.

The radiating elements 121B are positioned such that when viewed in plan view in the normal direction to the dielectric substrate 130A (the Z-axis direction), an imaginary line passing through the center of each radiating element 121B, extending in the Y-axis direction, is situated between two adjacent radiating elements 121A. The pitch P2 between the radiating elements 121B is wider than the pitch P1 between the radiating elements 121A. Such a disposition of the radiating elements 121A and the radiating elements 121B provides isolation between the radiating elements 121A and the radiating elements 121B.

A measurement L2 in the Z-axis direction of the dielectric substrate 130B is shorter than a measurement L1 in the Y-axis direction of the dielectric substrate 130A (L1>L2). A distance W2 from the center of a radiating element 121B positioned at an end portion (a second end portion) in the X-axis direction of the dielectric substrate 130B to a short side (a side along the Z axis) of the end portion of the dielectric substrate 130B is longer than a distance W1 from the center of a radiating element 121A positioned at an end portion (a first end portion) in the X-axis direction of the dielectric substrate 130A to a short side (a side along the Y axis) of the end portion of the dielectric substrate 130A.

Although not illustrated in FIG. 1, feed lines traversing the dielectric substrate 130A, the joint members 135, and the dielectric substrate 130B are usable to feed radio-frequency signals from the RFIC 110 to the radiating elements 121B.

An antenna module having the configuration illustrated in FIG. 2 can be used in a slim mobile information terminal such as a smartphone, to emit radio waves in different directions. In the case in which the antenna module 100 is used in this kind of mobile terminal, the antenna module 100 is positioned such that the dielectric substrate 130A faces a major surface having a display, and the dielectric substrate 130B faces a side surface perpendicular to the thickness direction. For this reason, regarding the radiating elements 121B disposed at the dielectric substrate 130B, the measurement L2 in the Z-axis direction of the dielectric substrate 130B can be limited by the requirement of slim configuration.

Concerning microstrip antennas using planar radiating elements, such as the antenna module 100, as the area of the dielectric substrate (in other words, the area of a ground electrode) diminishes with respect to the radiating elements, the distance between the radiating elements and the ground electrode in the polarization direction decreases, and the antenna characteristics usually tend to degrade.

The present inventors discovered that when the area of the ground electrode in the polarization direction is limited, expansions in the area of the ground electrode perpendicular to the polarization direction reduce degradation of the antenna characteristics.

Figure 3:
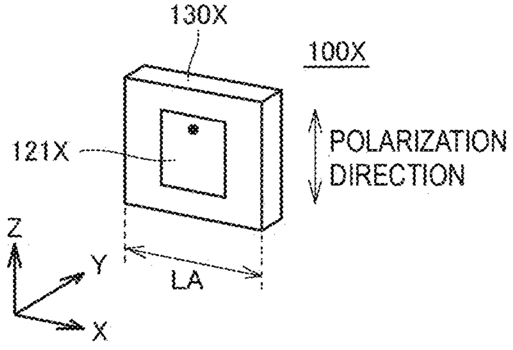
FIG. 3 is a perspective view of an antenna module that was used in a simulation.
Figure 4:
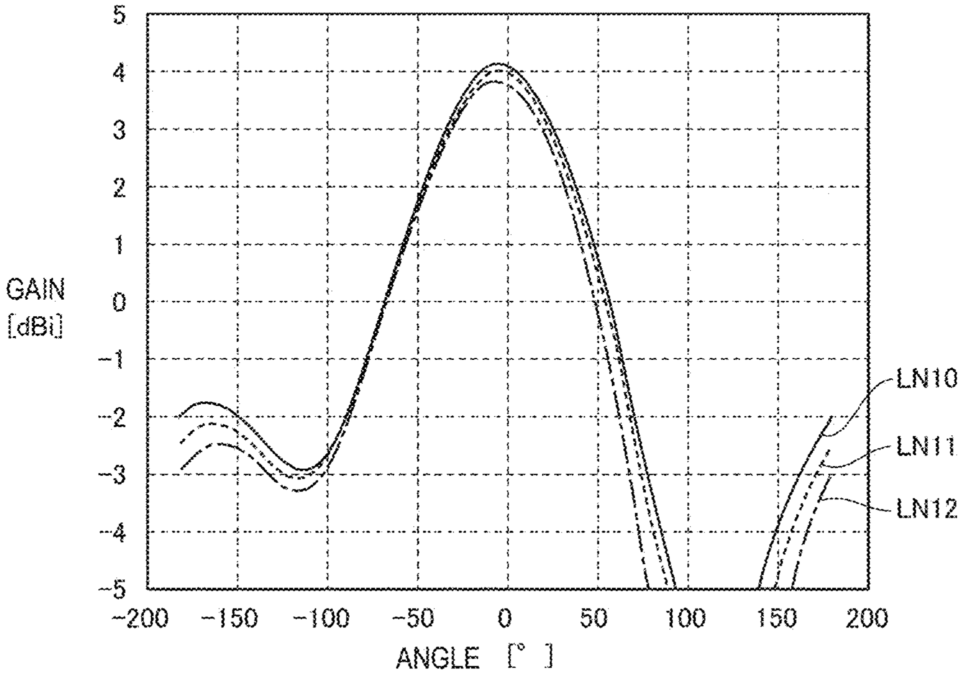
FIG. 4 illustrates a simulation result about antenna gain with changes of a measurement of a dielectric substrate.

FIGS. 3 and 4 illustrate the reduction of degradation of the antenna characteristics. FIG. 3 is a perspective view of an antenna module 100X, which was used in a simulation. FIG. 4 illustrates a simulation result represented as a plot of antenna gain (the vertical axis) against angle ranging from the normal direction to a radiating element (the Y-axis direction) to the Z-axis direction in a YZ section (the horizontal axis).

For ease of description, in this simulation, the antenna module 100X is configured such that one radiating element 121X is disposed at the dielectric substrate 130X. The simulation compared three different amounts (A1>A2>A3) of a measurement LA in the X-axis direction of the dielectric substrate 130X with respect to antenna gain under the condition that the measurement in the Z-axis direction in FIG. 3, which corresponds to the polarization direction, of the dielectric substrate 130X was limited.

Referring to FIG. 4, a solid line LN10 indicates the antenna gain when the measurement LA=A1, a dashed line LN11 indicates the antenna gain when the measurement LA=A2, and a dot-dash line LN12 indicates the antenna gain when the measurement LA=A3. As illustrated in FIG. 4, as the measurement LA in the X-axis direction of the dielectric substrate 130X increases, the antenna gain also increases. This means that when the area of the dielectric substrate (the ground electrode) in the polarization direction is limited, expansions in the area of the dielectric substrate perpendicular to the polarization direction reduce degradation of antenna gain.

In the antenna module 100 illustrated in FIG. 2, the number ($n_1$) of radiating elements 121B disposed at the dielectric substrate 130B is smaller than the number ($m_1$) of radiating elements 121A disposed at the dielectric substrate 130A ($m_1 > n_1$), and as a result, the pitch P2 at the dielectric substrate 130B is wider than the pitch P1 at the dielectric substrate 130A (P1<P2). Additionally, with respect to the direction in which the radiating elements are disposed (the X-axis direction), the distance (W2) from a radiating element 121B disposed at an end portion to the dielectric substrate 130B is larger than the distance (W1) from a radiating element 121A at the dielectric substrate 130A to the dielectric substrate 130A. This means that the radiating elements 121B are positioned such that the area of the dielectric substrate 130B in a direction (the X-axis direction) perpendicular to the direction (the Z-axis direction) in which the dielectric substrate 130B is limited is larger than that of the dielectric substrate 130A. As described above, when the size of the dielectric substrate is limited because the area per one radiating element of the ground electrode is expanded, this configuration reduces degradation of the antenna characteristics.

The "dielectric substrate 130A" and the "dielectric substrate 130B" in the first exemplary embodiment respectively correspond to a "first substrate" and a "second substrate" in the present disclosure. The "radiating elements 121A" and the "radiating elements 121B" in the first exemplary embodiment respectively correspond to "first radiating elements" and "second radiating elements" in the present disclosure. The "X-axis direction" in the first exemplary embodiment corresponds to a "first direction" in the present disclosure. The short side of the dielectric substrate 130A and the short side of the dielectric substrate 130B in the first exemplary embodiment respectively correspond to a "first side" and a "second side" in the present disclosure. A long side of the dielectric substrate 130A and a long side of the dielectric substrate 130B in the first exemplary embodiment respectively correspond to a "third side" and a "fourth side" in the present disclosure.

(First Modification)

In the antenna module 100 of the first exemplary embodiment, the RFIC 110 is disposed at the dielectric substrate 130A. In a first modification, a configuration in which the RFIC 110 is disposed at the dielectric substrate 130B will be described.

Figure 5:
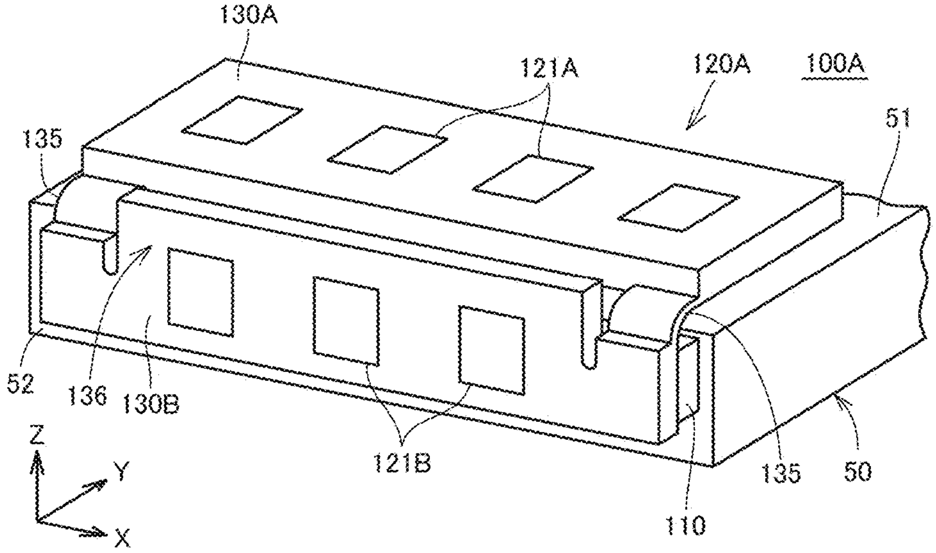
FIG. 5 is a perspective view of an antenna module of a first modification.

FIG. 5 is a perspective view of an antenna module 100A of the first modification. In the antenna module 100A, the RFIC 110 is disposed on the back surface side of the dielectric substrate 130B of an antenna unit 120A. The antenna unit 120A is coupled to the side surface 52 of the mounting board 50 with the RFIC 110. The other configurational features of the antenna module 100A are the same as the antenna module 100 of the first exemplary embodiment. Other parameters (measurements) regarding disposition of the radiating elements are the same as the antenna module 100 of the first exemplary embodiment. Descriptions of the same elements as the antenna module 100 are not repeated.

In the case of the antenna module 100 of the first exemplary embodiment, the RFIC 110 is disposed at the dielectric substrate 130A, which has more radiating elements. This disposition decreases the number of feed lines having relatively long path lengths and consequently reduces losses caused along with radio-frequency signal transfer. By contrast, in the case in which, as in the antenna module 100A of the first modification, the RFIC 110 is disposed at the dielectric substrate 130B, which has fewer radiating elements, this disposition reduces board real estate at the major surface 51 of the mounting board 50. As a result, the area of the mounting board 50 can be reduced, and the flexibility in component layout on the mounting board 50 can be enhanced.

Furthermore, by making the radiating elements 121B at the dielectric substrate 130B fewer than the radiating elements 121A at the dielectric substrate 130A, the area per one radiating element of the ground electrode in the dielectric substrate 130B is expanded. With this area expansion, degradation of the antenna characteristics is reduced.

The RFIC 110 is disposed at either dielectric substrate selected as appropriate to, for example, the allowable space size in the communication device 10 and the requirement about insertion loss.

(Second Modification)

In a second modification, a configuration in which the two dielectric substrates of the antenna unit are individually coupled to the mounting board.

Figure 6:
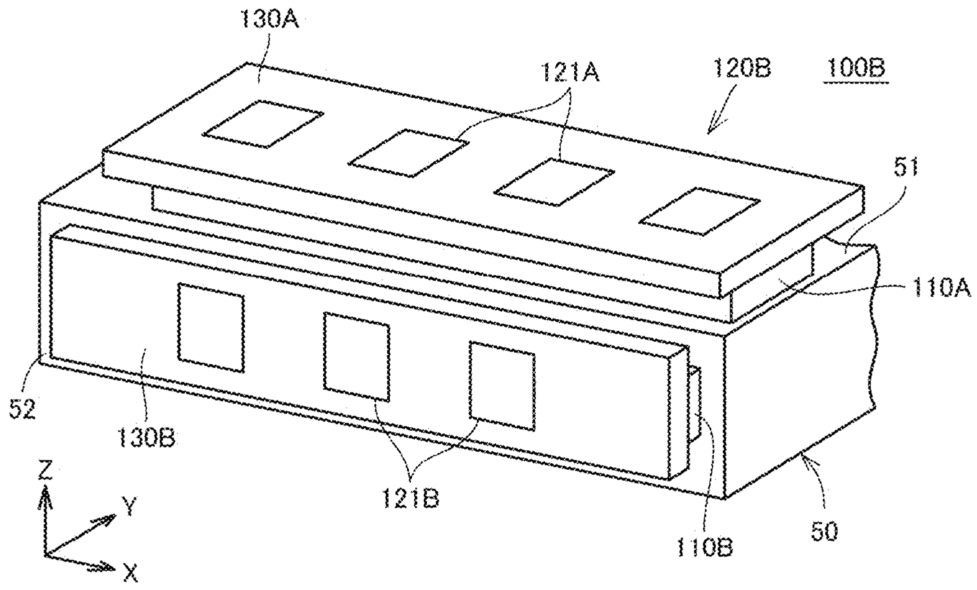
FIG. 6 is a perspective view of an antenna module of a second modification.

FIG. 6 is a perspective view of an antenna module 100B of the second modification. In an antenna unit 120B of the antenna module 100B, no joint member for coupling the dielectric substrates 130A and 130B is provided, and the dielectric substrates 130A and 130B are individually coupled to the mounting board 50. More specifically, the dielectric substrate 130A is coupled to the major surface 51 of the mounting board 50 with an RFIC 110A. The dielectric substrate 130B is coupled to the side surface 52 of the mounting board 50 with an RFIC 110B.

The RFIC 110A has the circuit (consisting of the switches 111A to 111D and other elements) for feeding radio-frequency signals to the dielectric substrate 130A, included in FIG. 1. The RFIC 110B has the circuit (consisting of switches 111E to 111H and other elements) for feeding radio-frequency signals to the dielectric substrate 130B, included in FIG. 1. The other configurational features of the antenna module 100B are the same as the antenna module 100 of the first exemplary embodiment. Other parameters (measurements) regarding disposition of the radiating elements are the same as in the case of the antenna module 100. Descriptions of the same elements as the antenna module 100 are not repeated.

Such a configuration in which the dielectric substrates 130A and 130B are individually disposed at the mounting board 50 as in the second modification enhances the flexibility of layout at the individual dielectric substrates. Furthermore, by making the radiating elements 121B at the dielectric substrate 130B fewer than the radiating elements 121A at the dielectric substrate 130A, the area per one radiating element of the ground electrode in the dielectric substrate 130B is expanded. With this area expansion, degradation of the antenna characteristics is reduced.

(Third Modification)

In a third modification, a configuration in which the two dielectric substrates are different from each other with respect to the measurement of the substrate in the direction in which the radiating elements are disposed (the X-axis direction) will be described.

Figure 7:
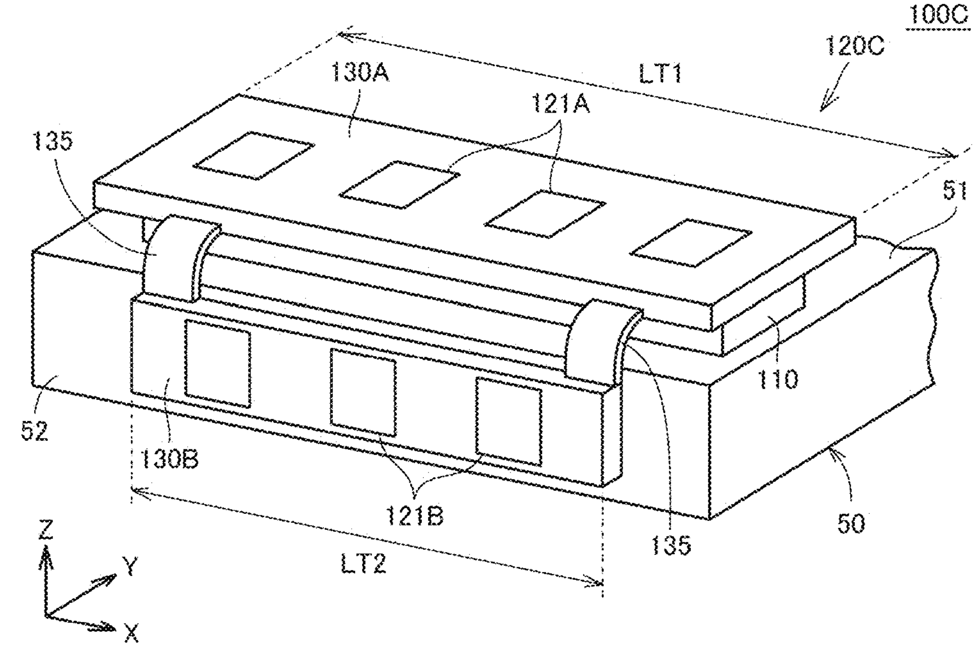
FIG. 7 is a perspective view of an antenna module of a third modification.

FIG. 7 is a perspective view of an antenna module 100C of the third modification. In an antenna unit 120C of the antenna module 100C, similarly to the antenna unit 120 of the first exemplary embodiment, the dielectric substrates 130A and 130B are coupled to each other by the joint members 135. However, in the antenna unit 120C, a measurement LT2 in the X-axis direction of the dielectric substrate 130B is smaller than a measurement LT1 in the X-axis direction of the dielectric substrate 130A. The joint members 135 are provided at both end portions of the dielectric substrate 130B. Other parameters (measurements) regarding disposition of the radiating elements are the same as the antenna module 100 of the first exemplary embodiment.

The reduction of the measurement LT2 in the X-axis direction of the dielectric substrate 130B diminishes the mounting region occupied by the dielectric substrate 130B of the side surface 52 of the mounting board 50. This configuration leaves regions for disposing other electronic devices and electronic elements at the side surface 52. Furthermore, by making the radiating elements 121B at the dielectric substrate 130B fewer than the radiating elements 121A at the dielectric substrate 130A, the area per one radiating element of the ground electrode in the dielectric substrate 130B is expanded. With this area expansion, degradation of the antenna characteristics is reduced.

Although not illustrated in the drawings, the measurement LT1 in the X-axis direction of the dielectric substrate 130A may be smaller than the measurement LT2 in the X-axis direction of the dielectric substrate 130B, in the opposite manner to the antenna module 100C. In this case, the joint members 135 are formed at both end portions of the dielectric substrate 130A, the measurement of which in the X-axis direction is shorter. Such a configuration expands regions for disposing other electronic devices and elements at the major surface 51 of the mounting board 50. When the pitch P1 between the radiating elements 121A at the dielectric substrate 130A is made shorter, the peak gain slightly decreases, but the range of tilt angle (steering angle) for beamforming expands.

(Fourth Modification)

In a fourth modification, a configuration in which the radiating elements are arranged in a two-dimensional array at each dielectric substrate will be described.

Figure 8:
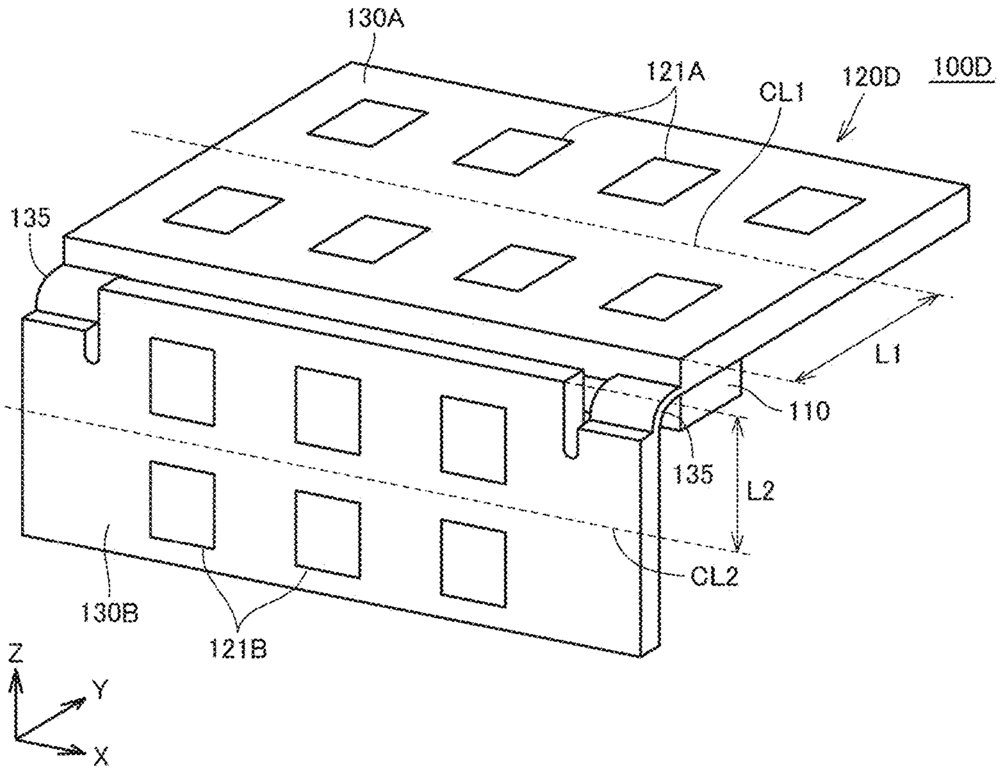
FIG. 8 is a perspective view of an antenna module of a fourth modification.

FIG. 8 is a perspective view of an antenna module 100D of the fourth modification. In an antenna unit 120D of the antenna module 100D, the measurement in the Y-axis direction of the dielectric substrate 130A and the measurement in the Z-axis direction of the dielectric substrate 130B are larger than the antenna unit 120 of the first exemplary embodiment; the radiating elements are arranged in two columns in the X-axis direction at each dielectric substrate.

In the case of the antenna module 100D of the fourth modification, the measurement L1 of the dielectric substrate 130A is defined as a measurement in the Y axis between an end portion on the dielectric substrate 130B side and an imaginary line CL1 connecting midpoints between adjacent radiating elements in the Y-axis direction. Similarly, the measurement L2 of the dielectric substrate 130B is defined as a measurement in the Z axis between an end portion on the dielectric substrate 130A side and an imaginary line CL2 connecting midpoints between adjacent radiating elements in the Z-axis direction.

The number of radiating elements 121A disposed in the X-axis direction at the dielectric substrate 130A is defined as the number of radiating elements 121A disposed near the end portion on the dielectric substrate 130B side (that is, the number of radiating elements in the region corresponding to L1). Similarly, the number of radiating elements 121B disposed in the X-axis direction at the dielectric substrate 130B is defined as the number of radiating elements 121B disposed near the end portion on the dielectric substrate 130A side (that is, the number of radiating elements in the region corresponding to L2). Other parameters (measurements) regarding disposition of the radiating elements are the same as the antenna module 100 of the first exemplary embodiment.

Also in the case of the antenna module 100D, the area of the ground electrode can be limited with respect to the radiating elements 121B disposed near the end portion of the dielectric substrate 130B. In this case, the number of radiating elements 121B on the dielectric substrate 130B side is made smaller than the number of radiating elements 121A on the dielectric substrate 130A side, so that the area per one radiating element of the ground electrode at the dielectric substrate 130B is increased. This configuration reduces degradation of the antenna characteristics.

(Fifth Modification)

In a fifth modification, a configuration in which a connector for connecting with an external device is disposed at the dielectric substrate 130B will be described.

Figure 9:
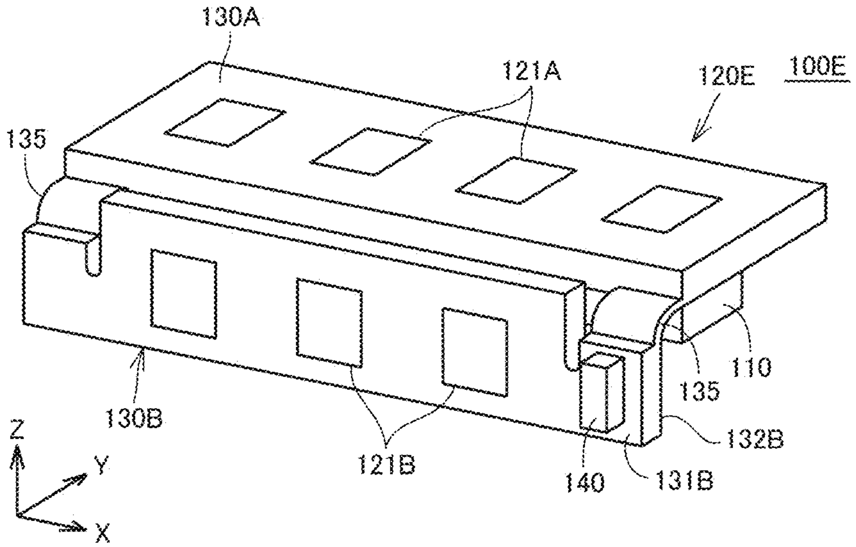
FIG. 9 is a perspective view of an antenna module of a fifth modification.

FIG. 9 is a perspective view of an antenna module 100E of the fifth modification. In an antenna unit 120E of the antenna module 100E, a connector 140 is disposed at the dielectric substrate 130B of the antenna unit 120 of the first exemplary embodiment. The connector 140 is positioned near an end portion in the X-axis direction on a surface 131B having the radiating elements 121B (that is, the front surface in the negative direction along the Y axis) of the dielectric substrate 130B. The other parts in FIG. 9 are fundamentally the same as in the configuration of the antenna module 100 of the first exemplary embodiment. Redundant descriptions of the same elements of the antenna module 100E as the antenna module 100 will not be repeated.

Figure 10:
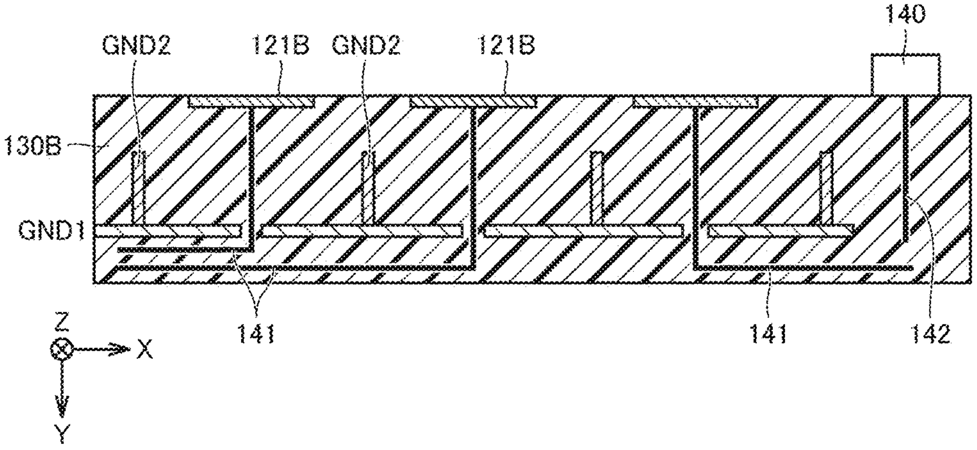
FIG. 10 is a sectional view of the antenna module of the fifth modification in FIG. 9.

FIG. 10 is a sectional view of the dielectric substrate 130B of the antenna module 100E when the dielectric substrate 130B is viewed in plan view from the front side in the negative direction along the Z axis. Referring to FIG. 10, a planar ground electrode GND1 is disposed in an inner layer of the dielectric substrate 130B; the ground electrode GND1 faces the radiating elements 121B of the dielectric substrate 130B. The ground electrode GND1 is formed such that the ground electrode GND1 extends through almost the entire region of the dielectric substrate 130B when viewed in plan view in the normal direction (the Y-axis direction) to the dielectric substrate 130B.

Feed lines 141 are operable to transfer radio-frequency signals from the RFIC 110 to the radiating elements 121B. The feed lines 141 originate from the RFIC 110, traverse the dielectric substrate 130A, continue through the joint members 135, and enter the dielectric substrate 130B. The feed lines 141 continue in a region (an interconnect region) before the ground electrode GND1 in the positive direction along the Y axis, extend through the ground electrode GND1 at the locations under the corresponding radiating elements 121B, and connect with the radiating elements 121B.

A connection wire 142 is coupled to the connector 140. The connection wire 142 extends from the connector 140 in the thickness direction of the dielectric substrate 130B (the Y-axis direction), traverse the joint members 135 and the dielectric substrate 130A, and connect with the RFIC 110. The connector 140 is operable to receive a signal and/or supply voltage, which is to be transferred through the joint members 135 to the dielectric substrate 130A side. As in FIG. 10, the ground electrode GND1 may be removed in a region under the connector 140 (on the front side in the positive direction along the Y axis).

As described above, the connector 140 for connecting with an external device is disposed at the dielectric substrate 130B. This configuration enhances the flexibility of component layout at the dielectric substrate 130A.

Because the connector 140 is disposed at the dielectric substrate 130B, the area per one radiating element of the ground electrode in the dielectric substrate 130B is reduced. In this regard, as illustrated in FIG. 10, ground electrodes GND2 shaped as columns or walls extending in the thickness direction of the dielectric substrate 130B (the Y-axis direction) are disposed in a region between the connector 140 and a radiating element 121B and regions between adjacent radiating elements so as to increase the degree of coupling between the radiating elements 121B and the ground electrode GND1. This configuration reduces degradation of the antenna characteristics.

The connector 140 is not necessarily a connector for connecting a wire for transferring radio-frequency signals. The connector 140 may be used as, for example, a fitting for fixing the antenna unit 120 to a casing of the communication device 10. The connector 140 may be disposed at a surface 132B of the dielectric substrate 130B.

The "surfaces 131B and 132B" in the fifth modification respectively correspond to a "first surface" and a "second surface" in the present disclosure.

Second Embodiment

In the first exemplary embodiment and the first to fifth modifications, configurations for emitting radio waves in one frequency band with an antenna module have been described. In a second exemplary embodiment, a configuration of an antenna module capable of emitting radio waves in two different frequency bands with an antenna module, that is, a dual-band antenna module, implemented with the features of the present disclosure, will be described.

Figure 11:
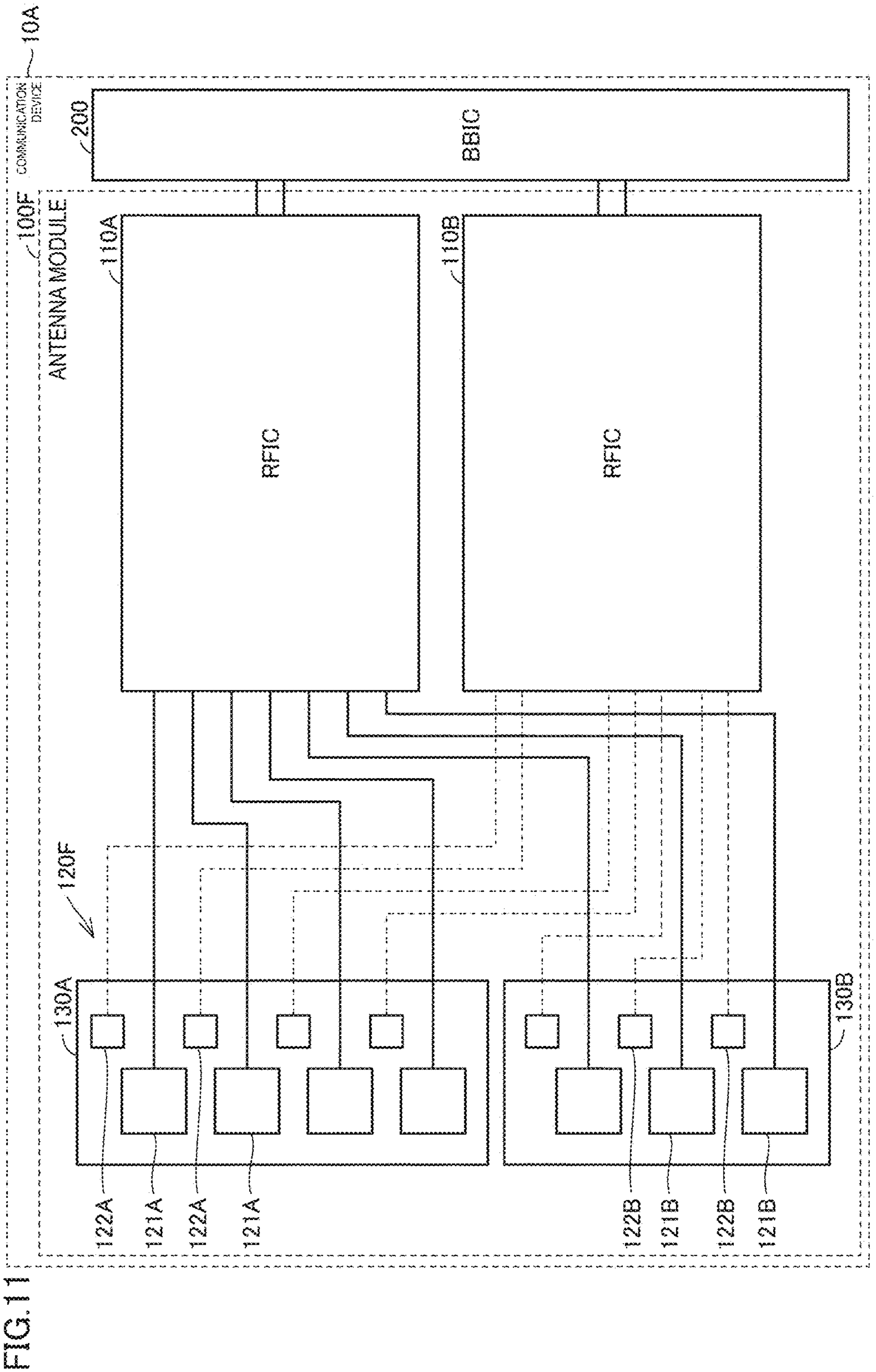
FIG. 11 is a block diagram of a communication device in which an antenna module according to a second exemplary embodiment is used.

FIG. 11 is a block diagram of a communication device 10A in which an antenna module 100F according to the second exemplary embodiment is used. Referring to FIG. 11, in an antenna unit 120F of the antenna module 100F, two kinds of radiating elements are disposed at each of the dielectric substrates 130A and 130B. More specifically, radiating elements 121A for emitting radio waves in a first frequency band and radiating elements 122A for emitting radio waves in a second frequency band are disposed at the dielectric substrate 130A. Similarly, radiating elements 121B for emitting radio waves in a first frequency band and radiating elements 122B for emitting radio waves in a second frequency band are disposed at the dielectric substrate 130B.

The radiating elements 121A, 121B, 122A, and 122B are formed by almost square plate electrodes. The measurements of the sides of the radiating elements 122A and 122B are smaller than the measurements of the sides of the radiating elements 121A and 121B. As a result, the frequency band (the second frequency band) of radio waves emitted by the radiating elements 122A and 122B is higher than the frequency band (the first frequency band) of radio waves emitted by the radiating elements 121A and 121B.

At the dielectric substrate 130A, the radiating elements 122A disposed are equal in number to the radiating elements 121A. At the dielectric substrate 130B, the radiating elements 122B disposed are equal in number to the radiating elements 121B.

The antenna module 100F further includes an RFIC 110A for feeding radio-frequency signals to the radiating elements 121A and 121B and an RFIC 110B for feeding radio-frequency signals to the radiating elements 122A and 122B. The configuration of the RFIC 100A and the configuration of the RFIC 100B are the same as the configuration of the RFIC 110 illustrated in FIG. 1, and details of the configuration are omitted in FIG. 11. This configuration enables the dielectric substrates 130A and 130B to emit radio waves in two different frequency bands.

In the antenna module 100F of the second exemplary embodiment, and antenna modules 100G and 100H, which will be described in sixth and seventh modifications, two kinds of radiating elements are disposed at both of the dielectric substrates 130A and 130B. However, two kinds of radiating elements may be disposed at one of the dielectric substrates 130A and 130B, and one kind of radiating elements may be disposed at the other of the dielectric substrates 130A and 130B.

Figure 12:
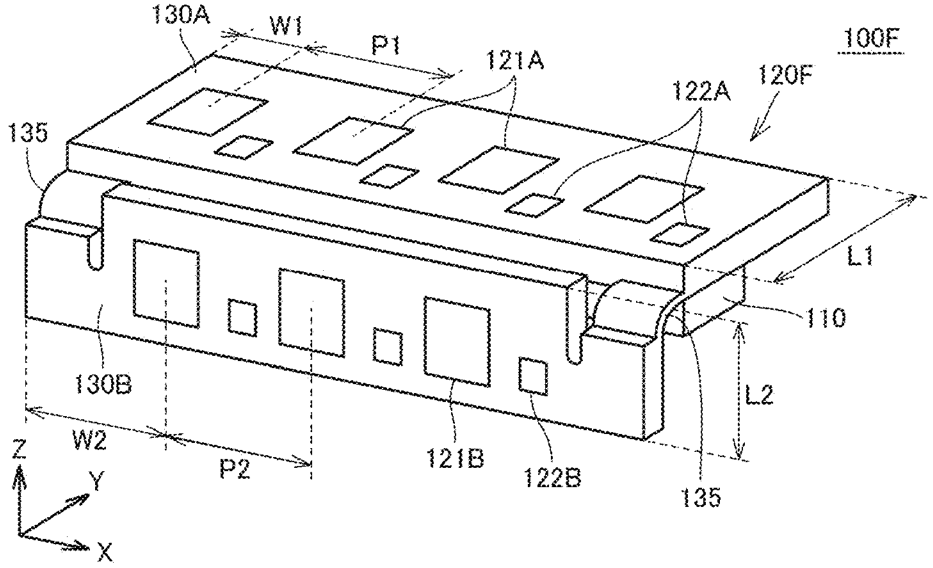
FIG. 12 is a perspective view of the antenna module according to the second exemplary embodiment.

FIG. 12 is a perspective view of the antenna module 100F according to the second exemplary embodiment. Referring to FIG. 12, in the antenna unit 120F of the antenna module 100F, the radiating elements 121A and 122A are disposed such that the radiating elements 121A and 122A are exposed at the surface of the dielectric substrate 130A. At the dielectric substrate 130A, a number $m_1$ of radiating elements 121A are disposed at regular intervals in the X-axis direction, and a number $m_2$ of radiating elements 122A are disposed at regular intervals in the X-axis direction. When viewed in plan view in the normal direction to the dielectric substrate 130A, the radiating elements 122A and 121A are aligned. In the antenna module 100F in FIG. 12, the radiating elements 121A are equal in number to the radiating elements 122A ($m_1=m_2$). FIG. 12 illustrates a configuration in which the radiating elements 121A and 122A are alternately disposed in the X-axis direction, but the radiating elements 121A and 122A may be disposed adjacent to each other in the Y-axis direction.

Similarly, in the antenna unit 120F, the radiating elements 121B and 122B are disposed such that the radiating elements 121B and 122B are exposed at the surface of the dielectric substrate 130B. At the dielectric substrate 130B, a number $n_1$ of radiating elements 121B are disposed at regular intervals in the X-axis direction, and a number $n_2$ of radiating elements 122B are disposed at regular intervals in the X-axis direction. When viewed in plan view in the normal direction to the dielectric substrate 130B, the radiating elements 122B and 121B are aligned. In the antenna module 100F in FIG. 12, the radiating elements 121B are equal in number to the radiating elements 122B ($n_1=n_2$). FIG. 12 illustrates a configuration in which the radiating elements 121B and 122B are alternately disposed in the X-axis direction, but the radiating elements 121B and 122B may be disposed adjacent to each other in the Z-axis direction.

The relationship among the parameters (measurements) of the measurements L1 and L2 of a short side perpendicular to the X-axis direction, the pitches P1 and P2 between radiating elements, and the distances W1 and W2 from a short side to a radiating element at the dielectric substrates is determined in the same manner as the antenna module 100 of the first exemplary embodiment.

In the antenna module 100F configured as described above, due to the limitation of the measurement in the Z-axis direction of the dielectric substrate 130B, the antenna characteristics of the radiating elements 121B, which are the larger radiating elements at the dielectric substrate 130B (in other words, lower-frequency radiating elements), can be degraded. In this respect, by making the radiating elements 121B disposed at the dielectric substrate 130B fewer than the radiating elements 121A at the dielectric substrate 130A, the area per one radiating element of the ground electrode in the dielectric substrate 130B is expanded. With this area expansion, degradation of the antenna characteristics is reduced.

The configuration of the antenna module 100F in FIG. 12 in which the radiating elements are exposed at the surface of each dielectric substrate has been described, but, for example, some or all of the radiating elements may be disposed in an inner layer of the dielectric substrate.

The "radiating elements 122A" and the "radiating elements 122B" in the second exemplary embodiment respectively correspond to "third radiating elements" and "fourth radiating elements" in the present disclosure.

(Sixth Modification)

In a sixth modification, a dual-band stacked antenna module in which radiating elements overlap in the normal direction to the dielectric layer of each dielectric substrate will be described.

Figure 13:
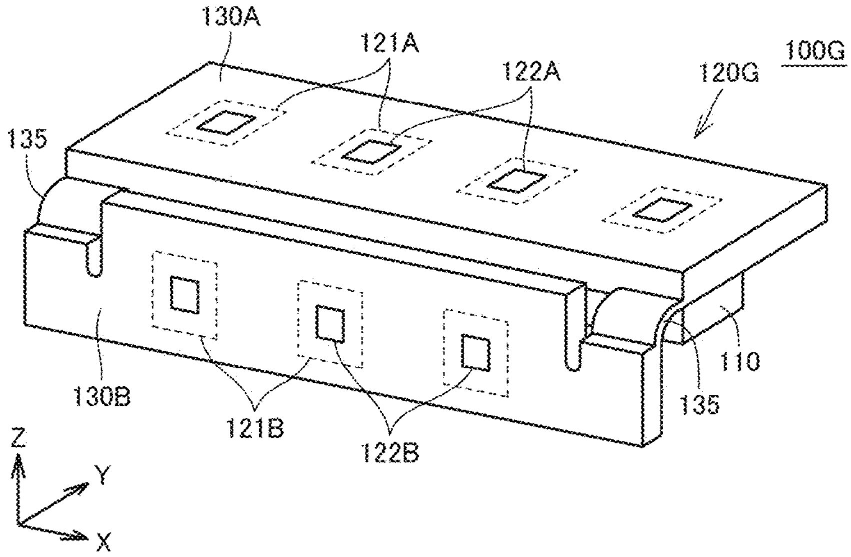
FIG. 13 is a perspective view of an antenna module of a sixth modification.

FIG. 13 is a perspective view of an antenna module 100G of the sixth modification. In an antenna unit 120G of the antenna module 100G, lower-frequency radiating elements are disposed in an inner layer of each dielectric substrate. When the dielectric substrate is viewed in plan view, higher-frequency radiating elements are disposed such that the higher-frequency radiating elements and the lower-frequency radiating elements overlap. More specifically, when viewed in plan view in the Z-axis direction, the radiating elements 121A and 122A overlap at the dielectric substrate 130A. When viewed in plan view in the Y-axis direction, the radiating elements 121B and 122B overlap at the dielectric substrate 130B.

The other configurational features of the antenna module 100G are the same as the antenna module 100F of the second exemplary embodiment. Other parameters (measurements) regarding disposition of the radiating elements are the same as in the case of the antenna module 100F. Descriptions of the same elements as the antenna module 100F are not repeated.

Also in the dual-band stacked antenna module 100G of the sixth modification, by making the radiating elements 121B disposed at the dielectric substrate 130B fewer than the radiating elements 121A at the dielectric substrate 130A, the area per one radiating element of the ground electrode in the dielectric substrate 130B is expanded. With this area expansion, degradation of the antenna characteristics is reduced.

(Seventh Modification)

In a seventh modification, a dual-band antenna module in which the radiating elements at each dielectric substrate are rotated with respect to the dielectric substrate will be described.

Figure 14:
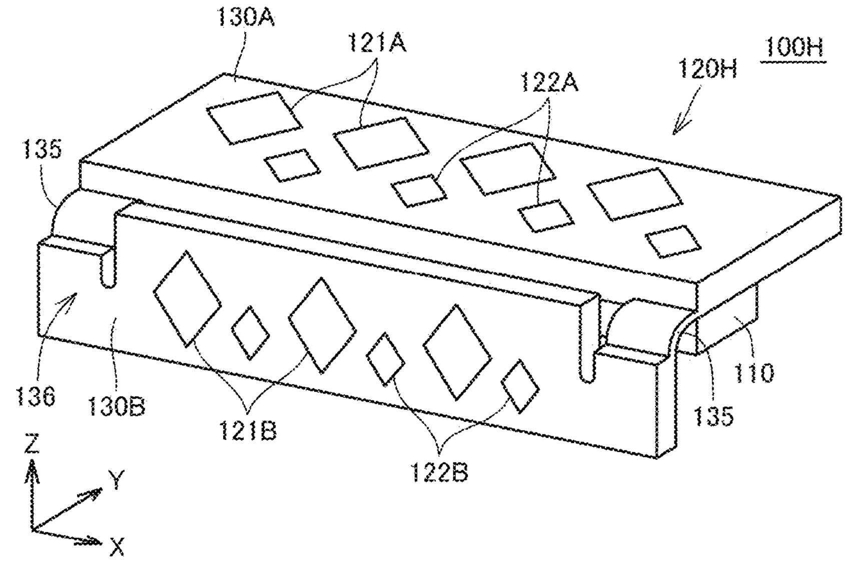
FIG. 14 is a perspective view of an antenna module of a seventh modification.

FIG. 14 is a perspective view of an antenna module 100H of the seventh modification. In an antenna unit 120H of the antenna module 100H, similarly to the antenna module 100F illustrated in FIG. 12, lower-frequency radiating elements and higher-frequency radiating elements are aligned at each dielectric substrate. However, in the antenna unit 120H, the radiating elements are disposed such that the sides of each rectangular radiating element are tilted with respect to the sides of the dielectric substrate. More specifically, the angle that each side of the radiating element forms with the direction in which the radiating elements are disposed (the X-axis direction) is greater than 0° and less than 90°; it is preferable that the angle be set to 45°.

With this disposition of radiating elements, the polarization direction of radio waves emitted by each radiating element is tilted with respect to the sides of the dielectric substrate. This configuration increases the area of the ground electrode in the polarization direction, as compared to when the polarization direction is parallel (or perpendicular) to the sides. As a result, in particular, the lower-frequency radiating elements, which are relatively large in size, achieve better antenna characteristics.

In the antenna module 100H in FIG. 14, the radiating elements are tilted at the dielectric substrates 130A and 130B. However, the radiating elements at one of the dielectric substrates 130A and 130B may be tilted, and the radiating elements at the other of the dielectric substrates 130A and 130B may be disposed as in the antenna module 100F illustrated in FIG. 12 rather than being tilted. In a stacked antenna module such as the antenna module 100G illustrated in FIG. 13, the radiating elements may be tilted.

Third Embodiment

In the first and second exemplary embodiments, configurations in which the devices in the RFIC such as power amplifiers and low-noise amplifiers are provided for the individual radiating elements have been described. In a third exemplary embodiment, a configuration will be described in which the ports in the RFIC are reduced with the use of hybrid couplers to decrease the size, while the radiating elements and the radiating surfaces are unchanged; this configuration maintains the space coverage of emitted radio waves. Note that signals that are 90° out of phase with each other can be fed to two different antenna units by using hybrid couplers.

Figure 15:
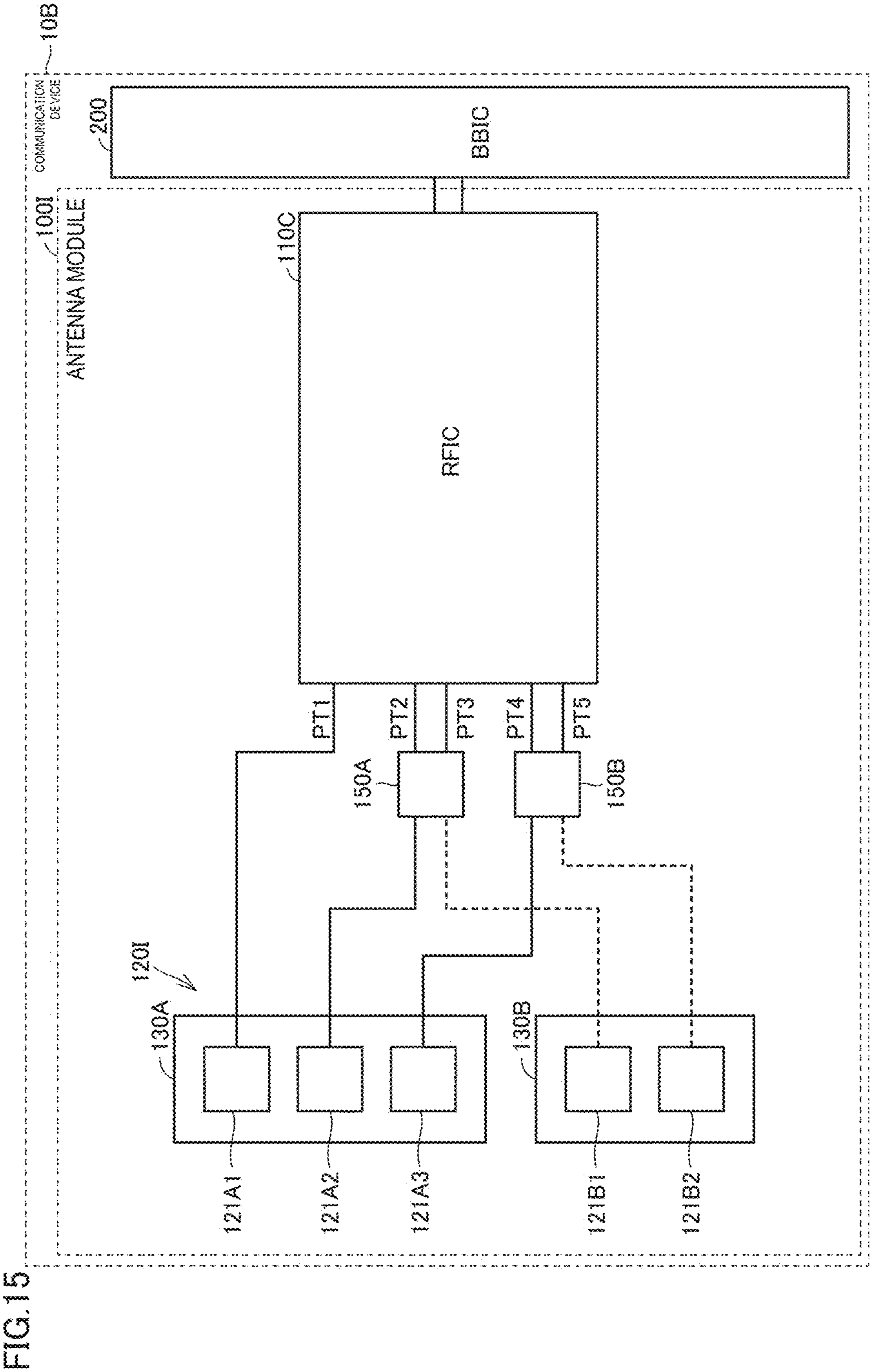
FIG. 15 is a block diagram of a communication device in which an antenna module according to a third exemplary embodiment is used.

FIG. 15 is a block diagram of a communication device 10B in which an antenna module 100I according to the third exemplary embodiment is used. Referring to FIG. 15, the antenna module 100I includes an antenna unit 120I, an RFIC 110C, and hybrid couplers 150A and 150B (both are hereinafter also referred to as the "hybrid coupler 150"). In the antenna unit 120I, three radiating elements 121A1 to 121A3 are disposed at the dielectric substrate 130A, and two radiating elements 121B1 and 121B2 are disposed at the dielectric substrate 130B.

Although the internal circuits of the RFIC 110C are not illustrated, circuits corresponding to five output ports PT1 to PT5 are formed in the RFIC 110C. The output port PT1 is coupled to the radiating element 121A1 of the dielectric substrate 130A. The output ports PT2 and PT3 are respectively coupled to two input terminals of the hybrid coupler 150A. The output ports PT4 and PT5 are respectively coupled to two input terminals of the hybrid coupler 150B.

Of the hybrid coupler 150A, one output terminal is coupled to the radiating element 121A2 of the dielectric substrate 130A, and the other output terminal is coupled to the radiating element 121B1 of the dielectric substrate 130B. Of the hybrid coupler 150B, one output terminal is coupled to the radiating element 121A3 of the dielectric substrate 130A, and the other output terminal is coupled to the radiating element 121B2 of the dielectric substrate 130B.

Although not illustrated in the drawing, the dielectric substrates 130A and 130B form a substantially L-shape, similarly to the drawings including FIG. 2.

Figure 16:
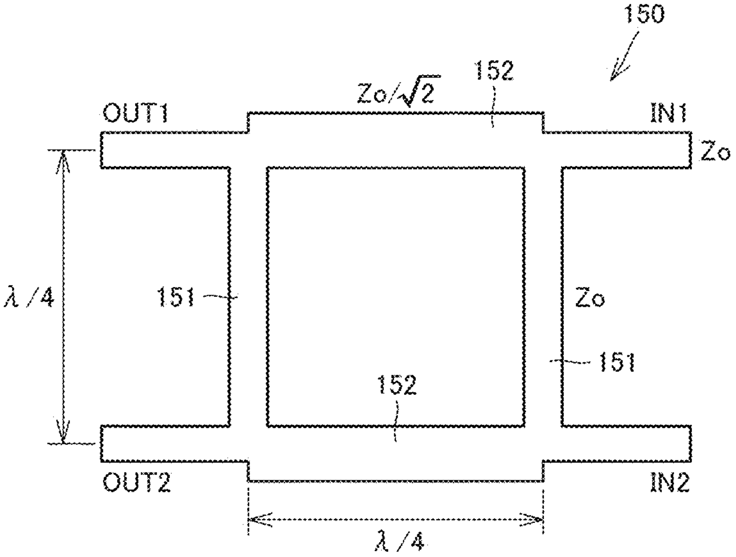
FIG. 16 illustrates a hybrid coupler.

FIG. 16 illustrates the hybrid coupler 150. The hybrid coupler 150 is a "90° hybrid circuit". The hybrid coupler 150 has a configuration in which two input terminals IN1 and IN2, two output terminals OUT1 and OUT2, two first lines 151 having a characteristic impedance of Zo, and two second lines 152 having an impedance of Zo/√2 are combined.

More specifically, one of the second lines 152 is connected between the input terminal IN1 and the output terminal OUT1, and the other of the second lines 152 is coupled between the input terminal IN2 and the output terminal OUT2. The input terminals IN1 and IN2 are coupled to each other by one of the first lines 151, and the output terminals OUT1 and OUT2 are coupled to each other by the other of the first lines 151. When λ is the wavelength of radio wave emitted by each radiating element, the length of the first line 151 and the length of the second lines 152 correspond to λ/4.

When a radio-frequency signal having a +90° phase difference from the input terminal IN1 is fed to the input terminal IN2 of the hybrid coupler 150, a radio-frequency signal having twice the power is outputted from the output terminal OUT1, but no radio-frequency signal is outputted from the output terminal OUT2. Conversely, when a radio-frequency signal having a −90° phase difference from the input terminal IN1 is fed to the input terminal IN2, a radio-frequency signal having twice the power is outputted from the output terminal OUT2, but no radio-frequency signal is outputted from the output terminal OUT1. This means that the hybrid coupler 150 is operable as a power combiner.

Overall, by controlling the phase of radio-frequency signal fed to the hybrid couplers 150A and 150B, when radio waves are emitted from the dielectric substrate 130A, the power of radio waves emitted by the radiating elements 121A2 and 121A3 is doubled; when radio waves are emitted from the dielectric substrate 130B, the power of radio waves emitted by the radiating elements 121B1 and 121B2 is doubled.

As described above, although simultaneous output of radio waves from both of the dielectric substrates 130A and 130B is unable, the use of hybrid couplers intensifies output of radiating radio waves, while reducing internal circuits in the RFIC to diminish the size.

The "radiating elements 121A1 to 121A3" in the third exemplary embodiment respectively correspond to a "first element" to a "third element" in the present disclosure. The "radiating elements 121B1 and 121B2" in the third exemplary embodiment respectively correspond to a "fourth element" and a "fifth element" in the present disclosure. The "hybrid couplers 150A and 150B" in the third exemplary embodiment respectively correspond to a "first hybrid coupler" and a "second hybrid coupler" in the present disclosure.

(Eighth Modification)

In an eighth modification, a configuration in which hybrid couplers and dividers are used to feed radio-frequency signals to radiating elements more than the output ports of the RFIC will be described.

Figure 17:
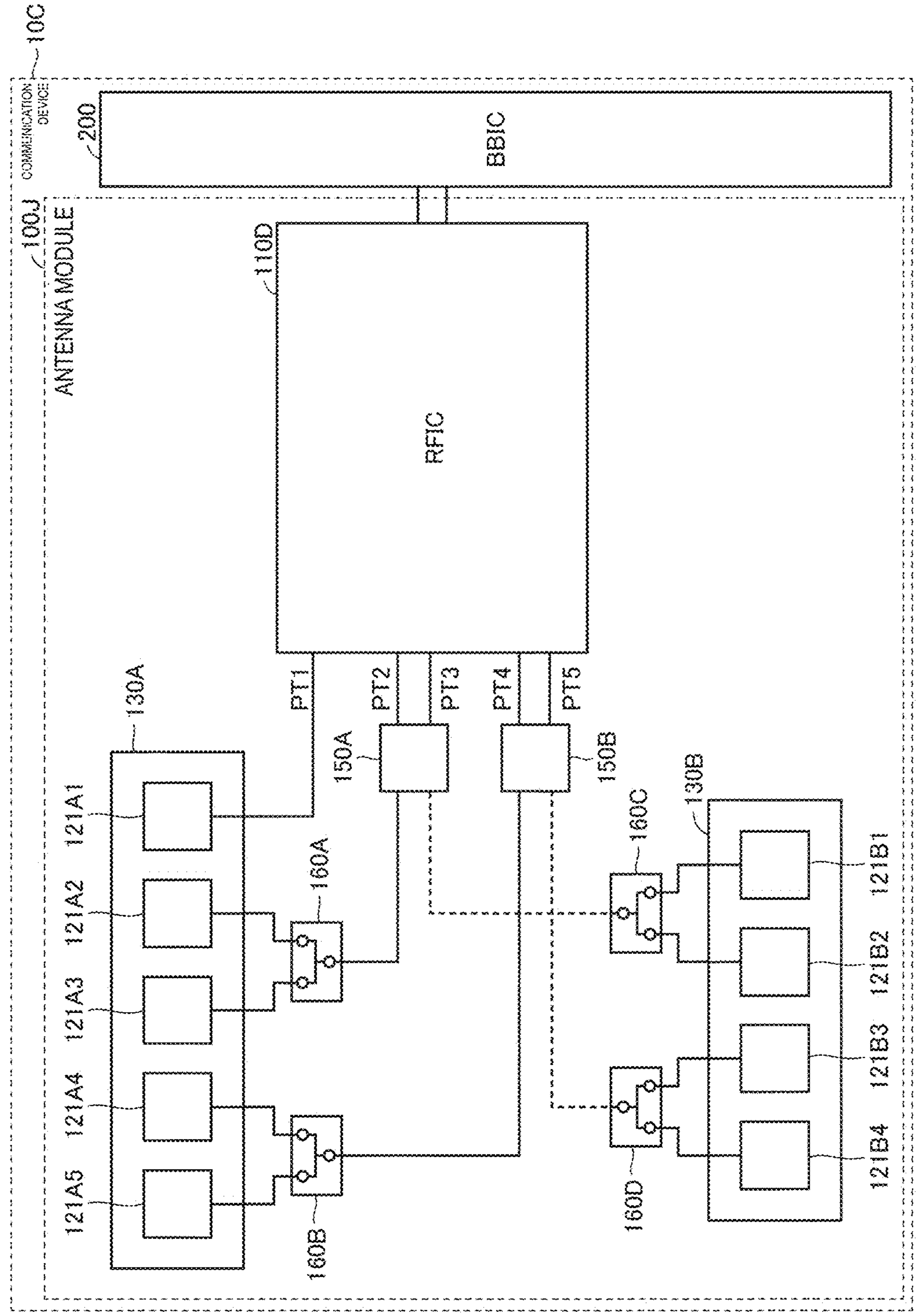
FIG. 17 is a block diagram of a communication device in which an antenna module according to an eighth modification is used.

FIG. 17 is a block diagram of a communication device 10C in which an antenna module 100J according to the eighth modification is used. Referring to FIG. 17, the antenna module 100J includes an antenna unit 120J, an RFIC 110D, the hybrid couplers 150A and 150B, and dividers 160A to 160D (all are hereinafter also referred to as the "divider 160"). Each of the dividers 160A to 160D is operable to divide a signal fed to its input terminal and output signals with a particular characteristic impedance from two output terminals.

In the antenna unit 120J, five radiating elements 121A1 to 121A5 are disposed at the dielectric substrate 130A, and four radiating elements 121B1 to 121B4 are disposed at the dielectric substrate 130B.

Similarly to the antenna module 100I of the third exemplary embodiment, the RFIC 110D includes the five output ports PT1 to PT5. The output port PT1 is coupled to the radiating element 121A1 of the dielectric substrate 130A. The output ports PT2 and PT3 are respectively coupled to two input terminals of the hybrid coupler 150A. The output ports PT4 and PT5 are respectively coupled to two input terminals of the hybrid coupler 150B.

One output terminal of the hybrid coupler 150A is coupled to an input terminal of the divider 160A. Of the divider 160A, one output terminal is coupled to the radiating element 121A2 of the dielectric substrate 130A, and the other output terminal is coupled to the radiating element 121A3 of the dielectric substrate 130A. The other output terminal of the hybrid coupler 150A is coupled to an input terminal of the divider 160C. Of the divider 160C, one output terminal is coupled to the radiating element 121B1 of the dielectric substrate 130B, and the other output terminal is coupled to the radiating element 121B2 of the dielectric substrate 130B.

Similarly, one output terminal of the hybrid coupler 150B is coupled to an input terminal of the divider 160B. Of the divider 160B, one output terminal is coupled to the radiating element 121A4 of the dielectric substrate 130A, and the other output terminal is coupled to the radiating element 121A5 of the dielectric substrate 130A. The other output terminal of the hybrid coupler 150B is coupled to an input terminal of the divider 160D. Of the divider 160D, one output terminal is coupled to the radiating element 121B3 of the dielectric substrate 130B, and the other output terminal is coupled to the radiating element 121B4 of the dielectric substrate 130B.

As described in the third exemplary embodiment, by inputting to the hybrid coupler 150 two signals that are 90° out of phase with each other, a signal having twice the power is outputted from one of the two output terminals. In the antenna module 100J illustrated in FIG. 17, an output signal from the hybrid coupler 150 is divided into two lines by the corresponding divider 160 and fed to two radiating elements. With this configuration, radio-frequency signals having the same power are fed to the radiating elements of each dielectric substrate.

Such a configuration, in which the hybrid coupler 150 and the divider 160 are used in combination with each other, enables the RFIC 110D having five output ports to feed radio-frequency signals to both of the dielectric substrate 130A having the five radiating elements 121A1 to 121A5 and the dielectric substrate 130B having the four radiating elements 121B1 to 121B4.

The "radiating elements 121A1 to 121A5" in the eighth modification respectively correspond to a "first element" to a "fifth element" in the present disclosure. The "radiating elements 121B1 to 121B4" in the eighth modification respectively correspond to a "sixth element" to a "ninth element" in the present disclosure. The "dividers 160A to 160D" in the eighth modification respectively correspond to a "first divider" to a "fourth divider" in the present disclosure.

(Ninth Modification)

In a ninth modification, a case in which the radiating elements disposed at the two dielectric substrates are implemented by a combination of monopole antennas and patch antennas will be described.

Figure 18:
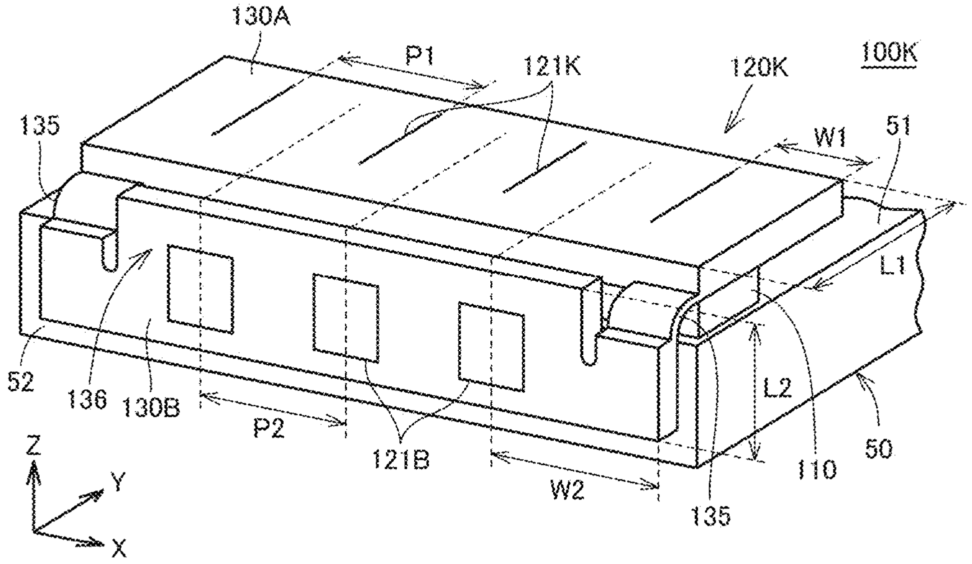
FIG. 18 is a perspective view of an antenna module of a ninth modification.

FIG. 18 is a perspective view of an antenna module 100K according to the ninth modification. In an antenna unit 120K of the antenna module 100K, monopole antennas are disposed at the dielectric substrate 130A, and patch antennas are disposed at the dielectric substrate 130B.

More specifically, at the dielectric substrate 130A, four linear radiating elements 121K extending in the Y-axis direction are disposed at the pitches P1 in the X-axis direction. At the dielectric substrate 130B, similarly to the antenna module 100 of the first exemplary embodiment, the three planar radiating elements 121B are disposed at the pitches P2 in the X-axis direction.

When W1 is the distance from the center of a radiating element 121K disposed at an end portion in the X-axis direction of the dielectric substrate 130A to the short side of the dielectric substrate 130A, the distance W2 from the center of a radiating element 121B disposed at an end portion in the X-axis direction of the dielectric substrate 130B to the short side of the end portion of the dielectric substrate 130B is longer than the distance W1. The pitch P2 between the radiating elements 121B is wider than the pitch P1 between the radiating elements 121K.

As described above, in the antenna module in which monopole antennas and patch antennas are combined, the radiating elements are disposed in accordance with the same measurements as the antenna module 100 of the first exemplary embodiment. When the measurements of the dielectric substrate are limited, this configuration reduces degradation of the antenna characteristics.

FIG. 18 illustrates the configuration in which monopole antennas are disposed at the dielectric substrate 130A, and patch antennas are disposed at the dielectric substrate 130B; but alternatively, patch antennas may be disposed at the dielectric substrate 130A, and monopole antennas may be disposed at the dielectric substrate 130B.

When the line electrodes that implement the radiating elements 121K are disposed in multiple layers, the positional relationship described above applies to the electrodes positioned closest to the surface of the dielectric substrate.

(Tenth Modification)

In a tenth modification, a case in which the radiating elements disposed at the two dielectric substrates are implemented by a combination of dipole antennas and patch antennas will be described.

Figure 19:
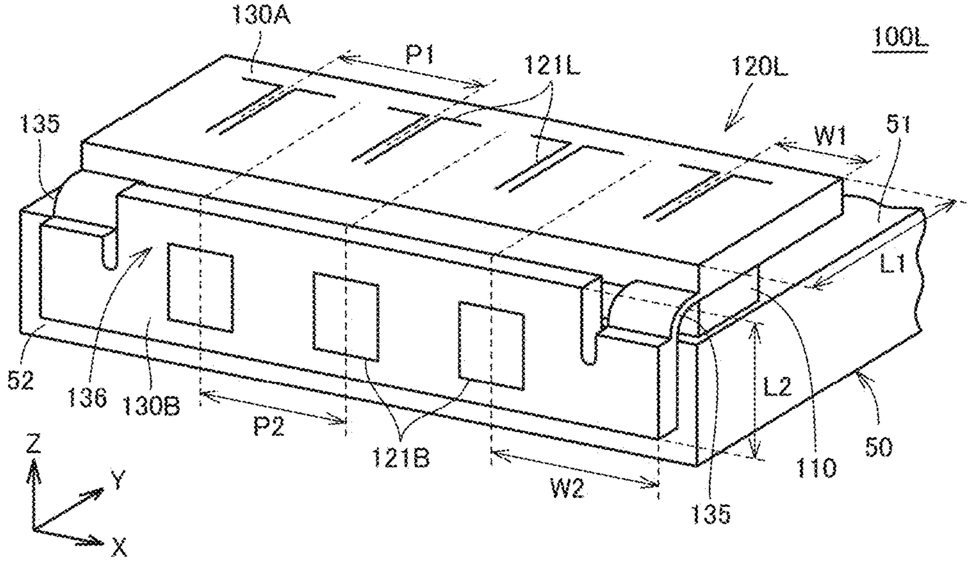
FIG. 19 is a perspective view of an antenna module of a tenth modification.

FIG. 19 is a perspective view of an antenna module 100L according to the tenth modification. In an antenna unit 120L of the antenna module 100L, dipole antennas are disposed at the dielectric substrate 130A, and patch antennas are disposed at the dielectric substrate 130B.

More specifically, at the dielectric substrate 130A, four linear radiating elements 121L each including two L-shaped line electrodes adjacent to each other are disposed at the pitches P1 in the X-axis direction. At the dielectric substrate 130B, the three planar radiating elements 121B are disposed at the pitches P2 in the X-axis direction. The pitch between adjacent radiating elements 121L corresponds to the distance between the intermediate points between two line electrodes.

When W1 is the distance from the intermediate point of a radiating element 121L disposed at an end portion in the X-axis direction of the dielectric substrate 130A to the short side of the dielectric substrate 130A, the distance W2 from the center of a radiating element 121B disposed at an end portion in the X-axis direction of the dielectric substrate 130B to the short side of the end portion of the dielectric substrate 130B is longer than the distance W1. The pitch P2 between the radiating elements 121B is wider than the pitch P1 between the radiating elements 121L.

As described above, in the antenna module in which dipole antennas and patch antennas are combined, the radiating elements are disposed in accordance with the same measurements as the antenna module 100 of the first exemplary embodiment. When the measurements of the dielectric substrate are limited, this configuration reduces degradation of the antenna characteristics.

Also in the tenth modification, patch antennas may be disposed at the dielectric substrate 130A, and dipole antennas may be disposed at the dielectric substrate 130B.

When the line electrodes that implement the radiating elements 121L are disposed in multiple layers, the positional relationship described above applies to the electrodes positioned closest to the surface of the dielectric substrate.

(Eleventh Modification)

In an eleventh modification, a case in which the radiating elements disposed at the two dielectric substrates are implemented by a combination of loop antennas and patch antennas will be described.

Figure 20:
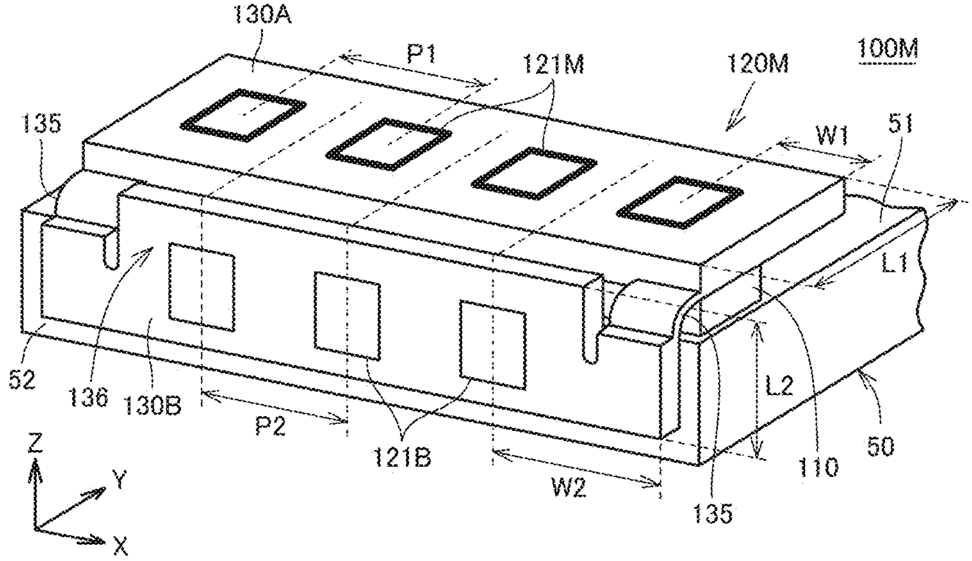
FIG. 20 is a perspective view of an antenna module of an eleventh modification.

FIG. 20 is a perspective view of an antenna module 100M according to the eleventh modification. In an antenna unit 120M of the antenna module 100M, loop antennas are disposed at the dielectric substrate 130A, and patch antennas are disposed at the dielectric substrate 130B.

More specifically, at the dielectric substrate 130A, four linear radiating elements 121M that are line electrodes shaped as loops wound around the winding axis parallel to the Z-axis direction are disposed at the pitches P1 in the X-axis direction. At the dielectric substrate 130B, the three planar radiating elements 121B are disposed at the pitches P2 in the X-axis direction. The pitch between adjacent radiating elements 121M corresponds to the distance between the centers in the winding axes of the electrodes.

When W1 is the distance from the center of a radiating element 121M disposed at an end portion in the X-axis direction of the dielectric substrate 130A to the short side of the dielectric substrate 130A, the distance W2 from the center of a radiating element 121B disposed at an end portion in the X-axis direction of the dielectric substrate 130B to the short side of the end portion of the dielectric substrate 130B is longer than the distance W1. The pitch P2 between the radiating elements 121B is wider than the pitch P1 between the radiating elements 121M.

As described above, in the antenna module in which loop antennas and patch antennas are combined, the radiating elements are disposed in accordance with the same measurements as the antenna module 100 of the first exemplary embodiment. When the measurements of the dielectric substrate are limited, this configuration reduces degradation of the antenna characteristics.

Also in the eleventh modification, patch antennas may be disposed at the dielectric substrate 130A, and loop antennas may be disposed at the dielectric substrate 130B.

(Twelfth Modification)

In a twelfth modification, a case in which the radiating elements disposed at the two dielectric substrates are implemented by a combination of slot antennas and patch antennas will be described.

Figure 21:
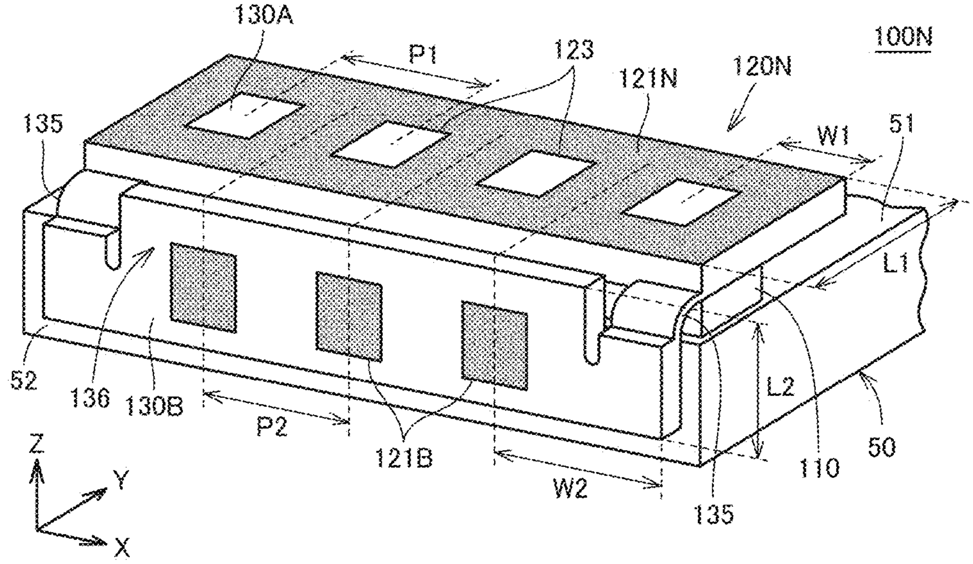
FIG. 21 is a perspective view of an antenna module of a twelfth modification.

FIG. 21 is a perspective view of an antenna module 100N according to the twelfth modification. In an antenna unit 120N of the antenna module 100N, slot antennas are disposed at the dielectric substrate 130A, and patch antennas are disposed at the dielectric substrate 130B.

More specifically, at the upper surface of the dielectric substrate 130A, a plate electrode 121N is disposed; the plate electrode 121N has four rectangular cavities (slots) 123 formed at the pitches P1 in the X-axis direction. In the plate electrode 121N, the cavities 123 are operable as slot antennas when radio-frequency signals are fed to the locations close to the cavities 123. This means that four slot antennas spaced apart from each other in the X-axis direction are form at the dielectric substrate 130A. The pitch between adjacent cavities 123 corresponds to the distance between the center points of the cavities 123.

At the dielectric substrate 130B, the three planar radiating elements 121B are disposed at the pitches P2 in the X-axis direction.

When W1 is the distance from the center of a cavity 123 formed at an end portion in the X-axis direction of the dielectric substrate 130A to the short side of the dielectric substrate 130A, the distance W2 from the center of a radiating element 121B disposed at an end portion in the X-axis direction of the dielectric substrate 130B to the short side of the end portion of the dielectric substrate 130B is longer than the distance W1. The pitch P2 between the radiating elements 121B is wider than the pitch P1 between the cavities 123.

As described above, in the antenna module in which slot antennas and patch antennas are combined, the radiating elements are disposed in accordance with the same measurements as the antenna module 100 of the first exemplary embodiment. When the measurements of the dielectric substrate are limited, this configuration reduces degradation of the antenna characteristics.

Also in the twelfth modification, patch antennas may be disposed at the dielectric substrate 130A, and slot antennas may be disposed at the dielectric substrate 130B. The radiating elements provided at the two dielectric substrates may be selected in any combination from patch antennas, monopole antennas, dipole antennas, loop antennas, and slot antennas, which have been described in the ninth to twelfth modifications.

The exemplary embodiments disclosed herein should be considered as examples in all respects and should not be interpreted as limiting. The scope of the present disclosure is indicated by the claims rather than the above descriptions of the exemplary embodiments, and all changes that come within the meaning and range of equivalency of the claims are therefore intended to be embraced therein.

REFERENCE SIGNS LIST

10, 10A-10C communication device, 50 mounting board, 51 major surface, 52 side surface, 100, 100A-100N, 100X antenna module, 110, 110A-110D RFIC, 111A-111H, 113A-113H, 117A, 117B switch, 112AR-112HR low-noise amplifier, 112AT-112HT power amplifier, 114A-114H attenuator, 115A-115H phase shifter, 116A, 116B signal combiner/splitter element, 118A, 118B mixer, 119A, 119B amplifier circuit, 120, 120A-120N antenna unit, 121A, 121A1-121A5, 121B, 121B1-121B4, 121K-121M, 121X, 122A, 122B radiating element, 121N plate electrode, 123 cavity, 130A, 130B, 130X dielectric substrate, 135 joint member, 136 raised portion, 140 connector, 141 feed line, 142 connection wire, 150, 150A, 150B hybrid coupler, 151 first line, 152 second line, 160, 160A-160D divider, 200 BBIC, GND1, GND2 ground electrode, IN1, IN2 input terminal, OUT1, OUT2 output terminal, PT1-PT5 output port.

The invention claimed is:

1. An antenna module comprising:

a first substrate and a second substrate that have different normal directions;

a number $m_1$ of first radiating elements disposed in a first direction at the first substrate; and a number $n_1$ of second radiating elements disposed in the first direction at the second substrate, wherein the first radiating elements disposed in the first direction are more than the second radiating elements disposed in the first direction ($m_1>n_1$), a measurement perpendicular to the first direction of the second substrate is shorter than a measurement perpendicular to the first direction of the first substrate, a distance from a second radiating element closest to a first end portion in the first direction of the second substrate to the first end portion is longer than a distance from a first radiating element closest to a second end portion in the first direction of the first substrate to the second end portion, and the first radiating elements and the second radiating elements are configured to emit a radio wave in a frequency band, wherein the antenna module further includes:

a number $m_2$ of third radiating elements disposed in the first direction at the first substrate, the third radiating elements being configured to emit a radio wave in a second frequency band higher than the first frequency band; and a number $n_2$ of fourth radiating elements disposed in the first direction at the second substrate, the fourth radiating elements being configured to emit a radio wave in the second frequency band.

2. The antenna module according to claim 1, wherein the first substrate has a rectangular shape when viewed in plan view in the normal direction to the first substrate, and the second substrate has a rectangular shape when viewed in plan view in the normal direction to the second substrate, a measurement of a second side perpendicular to the first direction of the second substrate is shorter than a measurement of a first side perpendicular to the first direction of the first substrate, and a distance from a second radiating element closest to the second side to the second side is longer than a distance from a first radiating element closest to the first side to the first side.

3. The antenna module according to claim 2, wherein a measurement of a third side parallel to the first direction of the first substrate is longer than a measurement of a fourth side parallel to the first direction of the second substrate.

4. The antenna module according to claim 3, further comprising:

a joint member connecting the first substrate and the second substrate, wherein the joint member is formed at both end portions in the first direction of the second substrate.

5. The antenna module according to claim 2, wherein a measurement of a third side parallel to the first direction of the first substrate is shorter than a measurement of a fourth side parallel to the first direction of the second substrate.

6. The antenna module according to claim 5, further comprising:

a joint member connecting the first substrate and the second substrate, wherein the joint member is formed at both end portions in the first direction of the first substrate.

7. The antenna module according to claim 1, wherein a pitch between adjacent second radiating elements in the first direction is wider than a pitch between adjacent first radiating elements in the first direction.

8. The antenna module according to claim 1, wherein the second radiating elements are positioned such that when viewed in plan view in the normal direction to the first substrate, an imaginary line passes through a center of each second radiating element, the imaginary line being perpendicular to the first direction, the imaginary line extending between adjacent first radiating elements.

9. The antenna module according to claim 1, wherein the first radiating elements are equal in number to the third radiating elements ($m_1=m_2$), and when viewed in plan view in the normal direction to the first substrate, each third radiating element overlaps a corresponding first radiating element among the first radiating elements.

10. The antenna module according to claim 1, wherein when viewed in plan view in the normal direction to the first substrate, the third radiating elements and the first radiating elements are aligned.

11. The antenna module according to claim 1, wherein each of the first radiating elements and the third radiating elements has a rectangular shape, and an angle that a side of each of the first radiating elements and the third radiating elements forms with the first direction is greater than 0° and less than 90°.

12. The antenna module according to claim 1, wherein the second radiating elements are equal in number to the fourth radiating elements ($n_1=n_2$), and when viewed in plan view in the normal direction to the second substrate, each fourth radiating element overlaps a corresponding second radiating element among the second radiating elements.

13. The antenna module according to claim 12, wherein each of the second radiating elements and the fourth radiating elements has a rectangular shape, and an angle that a side of each of the second radiating elements and the fourth radiating elements forms with the first direction is greater than 0° and less than 90°.

14. The antenna module according to claim 1, wherein when viewed in plan view in the normal direction to the second substrate, the fourth radiating elements and the second radiating elements are aligned.

15. The antenna module according to claim 1, wherein the second substrate has a first surface and a second surface that are perpendicular to the normal direction to the second substrate, the antenna module further comprising a connector disposed at the first surface or the second surface.

16. The antenna module according to claim 1, further comprising a feed circuit disposed at the first substrate, the feed circuit being configured to feed a radio-frequency signal to each radiating element.

17. The antenna module according to claim 1, further comprising a feed circuit disposed at the second substrate, the feed circuit being configured to feed a radio-frequency signal to each radiating element.

18. An antenna module comprising:

a first substrate and a second substrate that have different normal directions;

a number $m_1$ of first radiating elements disposed in a first direction at the first substrate; and a number $n_1$ of second radiating elements disposed in the first direction at the second substrate, wherein the first radiating elements disposed in the first direction are more than the second radiating elements disposed in the first direction ($m_1>n_1$), a measurement perpendicular to the first direction of the second substrate is shorter than a measurement perpendicular to the first direction of the first substrate, a distance from a second radiating element closest to a first end portion in the first direction of the second substrate to the first end portion is longer than a distance from a first radiating element closest to a second end portion in the first direction of the first substrate to the second end portion, and the first radiating elements and the second radiating elements are configured to emit a radio wave in a frequency band, wherein the first radiating elements include a first element, a second element, and a third element, and the second radiating elements include a fourth element and a fifth element, the antenna module further comprising:

a first hybrid coupler coupled to the first element and the fourth element; and a second hybrid coupler coupled to the second element and the fifth element.

19. An antenna module comprising:

a first substrate and a second substrate that have different normal directions;

a number $m_1$ of first radiating elements disposed in a first direction at the first substrate; and a number $n_1$ of second radiating elements disposed in the first direction at the second substrate, wherein the first radiating elements disposed in the first direction are more than the second radiating elements disposed in the first direction ($m_1>n_1$), a measurement perpendicular to the first direction of the second substrate is shorter than a measurement perpendicular to the first direction of the first substrate, a distance from a second radiating element closest to a first end portion in the first direction of the second substrate to the first end portion is longer than a distance from a first radiating element closest to a second end portion in the first direction of the first substrate to the second end portion, and the first radiating elements and the second radiating elements are configured to emit a radio wave in a frequency band, wherein the first radiating elements include a first element, a second element, a third element, a fourth element, and a fifth element, and the second radiating elements include a sixth element, a seventh element, an eighth element, and a ninth element, the antenna module further comprising:

a first divider coupled to the first element and the second element;

a second divider coupled to the third element and the fourth element;

a third divider coupled to the sixth element and the seventh element;

a fourth divider coupled to the eighth element and the ninth element;

a first hybrid coupler coupled to the first divider and the third divider; and a second hybrid coupler coupled to the second divider and the fourth divider.

* * * * *